(12) United States Patent
Ben-Ezra

(10) Patent No.: US 11,179,849 B1
(45) Date of Patent: Nov. 23, 2021

(54) SYSTEM AND METHOD FOR AUTOMATED ITEM DISPERSAL

(71) Applicant: Elisha Ben-Ezra, Jerusalem (IL)

(72) Inventor: Elisha Ben-Ezra, Jerusalem (IL)

( * ) Notice: Subject to any disclaimer, the term of this patent is extended or adjusted under 35 U.S.C. 154(b) by 0 days.

(21) Appl. No.: 17/239,607

(22) Filed: Apr. 25, 2021

(51) Int. Cl.
| | | |
|---|---|---|
| B25J 9/00 | (2006.01) | |
| B25J 9/16 | (2006.01) | |
| B25J 9/02 | (2006.01) | |
| B64F 1/36 | (2017.01) | |
| B25J 11/00 | (2006.01) | |
| B25J 13/08 | (2006.01) | |

(52) U.S. Cl.
CPC ............ *B25J 9/1664* (2013.01); *B25J 9/023* (2013.01); *B25J 9/1653* (2013.01); *B25J 9/1661* (2013.01); *B25J 9/1682* (2013.01); *B25J 11/008* (2013.01); *B25J 13/089* (2013.01); *B64F 1/368* (2013.01)

(58) Field of Classification Search
CPC ...... B25J 9/1664; B25J 9/1661; B25J 13/089; B25J 9/1682; B25J 9/1653; B25J 9/023; B25J 11/008; B64F 1/368
See application file for complete search history.

(56) References Cited

U.S. PATENT DOCUMENTS

| | | | |
|---|---|---|---|
| 4,053,741 A | 10/1977 | Ainoya et al. | |
| 4,162,869 A | 7/1979 | Hitomi et al. | |
| 4,630,216 A | 12/1986 | Tyler et al. | |
| 10,022,867 B2 | 7/2018 | Saboo et al. | |
| 10,089,586 B2 | 10/2018 | Vestal et al. | |
| 10,466,713 B2* | 11/2019 | Elazary ............... | B65G 1/1375 |
| 2018/0364045 A1 | 12/2018 | Williams et al. | |

FOREIGN PATENT DOCUMENTS

CN 109703607 B 5/2019

* cited by examiner

*Primary Examiner* — Ian Jen
(74) *Attorney, Agent, or Firm* — JMB Davis Ben David

(57) ABSTRACT

Disclosed herein is a system for transporting items having two or more robots configured to transport items throughout a facility, each robot transfers the items along a designated robot route, one or more automated carts configured to transport the item received from one or more robots, the automated carriage configured to transport the items along a designated cart route, a communication unit configured to provide the designate robot route to the robots and the designated cart route to the automated cart, and at least one processor configured to assign the robots to collect the items, assign the automated cart to receive the items; generate the robot route, designate a destination of the automated cart and, generate the cart route for the automated cart.

20 Claims, 19 Drawing Sheets

SYSTEM AND METHOD FOR AUTOMATED ITEM DISPERSAL

FIELD OF THE INVENTION

The present disclosure is in the field of item transportation.

BACKGROUND

Transportation of items and parcels requires careful handling and tracking of the parcel thereby ensuring that it arrives safely at its final destination. Mishandling of the parcels by porters can result in damage and/or misplacement of the parcels.

In airports, for example, baggage claim areas can be overwhelming and crowded. Travelers stand around conveyor belts trying to grab parcels as they are transported through the baggage claim area. Travelers can be hurt from others trying to remove parcels from the conveyor belt or the parcels are damaged as they are placed or removed from the conveyor belt. Furthermore, large crowds of people in baggage claim areas or other areas of ports of travel can significantly increases the spread of pathogens, can increase the likelihood of spreading diseases and contaminations, such as Covid-19, creating a significant health concern for ports of travel.

SUMMARY

The following embodiments and aspects thereof are described and illustrated in conjunction with systems, tools and methods which are meant to be exemplary and illustrative, not limiting in scope.

There is provided, in accordance with an embodiment, a system for transporting items, including at least two robots configured to transport items throughout a facility, wherein each robot of the at least two robots transfers the items along a designated robot route, at least one automated cart configured to transport the item received from at least one robot of the at least two robots, the at least one automated carriage configured to transport the at least one item along a designated cart route, and a communication unit configured to provide the designate robot route to the at least two robots and the designated cart route to the at least one automated cart at least one processor configured to assign the at least two robots to collect the items, assign the at least one automated cart to receive the items the at least two robots, generate the designated robot route, designate a destination of the at least one automated cart, and generate the designated cart route for the at least one automated cart.

In some embodiments, the at least one processor is configured to simulate a symmetric matrix of tracks through which the robot route and cart route are routed, determine a position within matrix of the at least two robots, and determine whether each robot of the at least two robots has been associated with the at least one automated cart.

In some embodiments, the at least one processor is further configured to determine a position of the automated cart relative to a central line of the symmetric matrix, determine whether a robot of the at least two robots associate with the at least one automated cart is positioned to the left or the right the symmetric line, and assign a value to the robot according to position relative to the symmetric line, the value determines when the robot travels to the at least one automated cart.

In some embodiments, the at least one processor is configured to command the at least two robots to simultaneously move to the automated cart.

In some embodiments, the robot path is arranged along a x-y coordinate system, and the cart path is arranged along a second x-y coordinate system.

In some embodiments, each robot is configured to return to a robot queue after deliver of the item to the automated cart according to a designated robot return path generated by the central system, and each automated cart is configured to return to a cart queue after the items are removed from the automated cart according to a designated cart return path generated by the central system.

In some embodiments, the computer system further includes a scanner at drop off zone configure to scan an item tag attached to the item to obtain an item identification; wherein the at least one processing unit is further configured to obtain the item identification from the scanner, associate the item identification with the robot and the automated cart carrying the item, and provide a notification of the item location in the drop-off zone.

In some embodiments, the robots are arranged in a robot arrangement matrix prior to travelling through the robot travel zone to enhance a movement of the robot.

In some embodiments, the system further includes a check-in station including a check-in scanner configured to scan an item tag to obtain an item identification, a check-in communication unit configured to provide the item identification to the computer system, wherein the item identification is stored with item information in a database of computer system.

In some embodiments, the one or more robots are arranged in a robot arrangement matrix to expedite movement of the at least two robots.

There is further provided, a method for transporting of at least one item performed by at least one processor configured to assign the at least two robots to collect the items, assign the at least one automated cart, generate the designated robot route, designate a destination of the at least one automated cart, and generate the designated cart route for the at least one automated cart.

In some embodiments, the at least one processor is further configured to simulate a symmetric matrix of tracks through which the robot route and cart route are routed, determine a position within matrix of the at least two robots, and determine whether each robot of the at least two robots has been associated with the at least one automated cart.

In some embodiments, the at least one processor is further configured to determine a position of the automated cart relative to a central line of the symmetric matrix, determine whether a robot of the at least two robots associate with the at least one automated cart is positioned to the left or the right the symmetric line, and assign a value to the robot according to position relative to the symmetric line, the value determines when the robot travels to the at least one automated cart.

In some embodiments, the at least one processor is configured to command the at least two robots to simultaneously move to the automated cart.

In some embodiments, the robot path is arranged along a x-y coordinate system, and the cart path is arranged along a second x-y coordinate system.

There is further provided with an embodiment, an airport system for dispersal of luggage, including two or more robots configured to have each robot collect a piece of luggage from a collection zone and carry the luggage to an automated cart along a robot path, two or more automated carriage with each automated cart having a compartment into which one or more luggage items are placed after delivery by one of the two or more robots, each automated carriage configured to carry the one or more luggage items to a designated parking spot in a baggage claim area, automated cart is configured to travel along a cart path, and a computerized system including a communication unit configured to enable communication with the two or more robots and the two or more automated carts, at least one processor configured to, designate a robot of the two or more robots to collect the luggage, designate the automated cart to which the robot the automated cart to which of the robots delivers the luggage, generate the robot path for the robot to travel from the collection zone to the automated cart, designate the parking spot for the automated cart, and generate the cart path for the automated cart.

In some embodiments, the at least one processor is further configured to simulate a symmetric matrix of tracks through which the robot route and cart route are routed, determine a position within matrix of the at least two robots, and determine whether each robot of the at least two robots has been associated with the at least one automated cart. In some embodiments, the at least one processor is further configured to determine a position of the automated cart relative to a central line of the symmetric matrix, determine whether a robot of the at least two robots associate with the at least one automated cart is positioned to the left or the right the symmetric line, and assign a value to the robot according to position relative to the symmetric line, the value determines when the robot travels to the at least one automated cart.

In some embodiments, the at least one processor is configured to command the at least two robots to simultaneously move to the automated cart.

In some embodiments, the robot path is arranged along a x-y coordinate system, and the cart path is arranged along a second x-y coordinate system.

The foregoing examples of the related art and limitations related therewith are intended to be illustrative and not exclusive. Other limitations of the related art will become apparent to those of skill in the art upon a reading of the specification and a study of the figures.

BRIEF DESCRIPTION OF THE DRAWINGS

Some non-limiting exemplary embodiments or features of the disclosed subject matter are illustrated in the following drawings.

Figure 1:
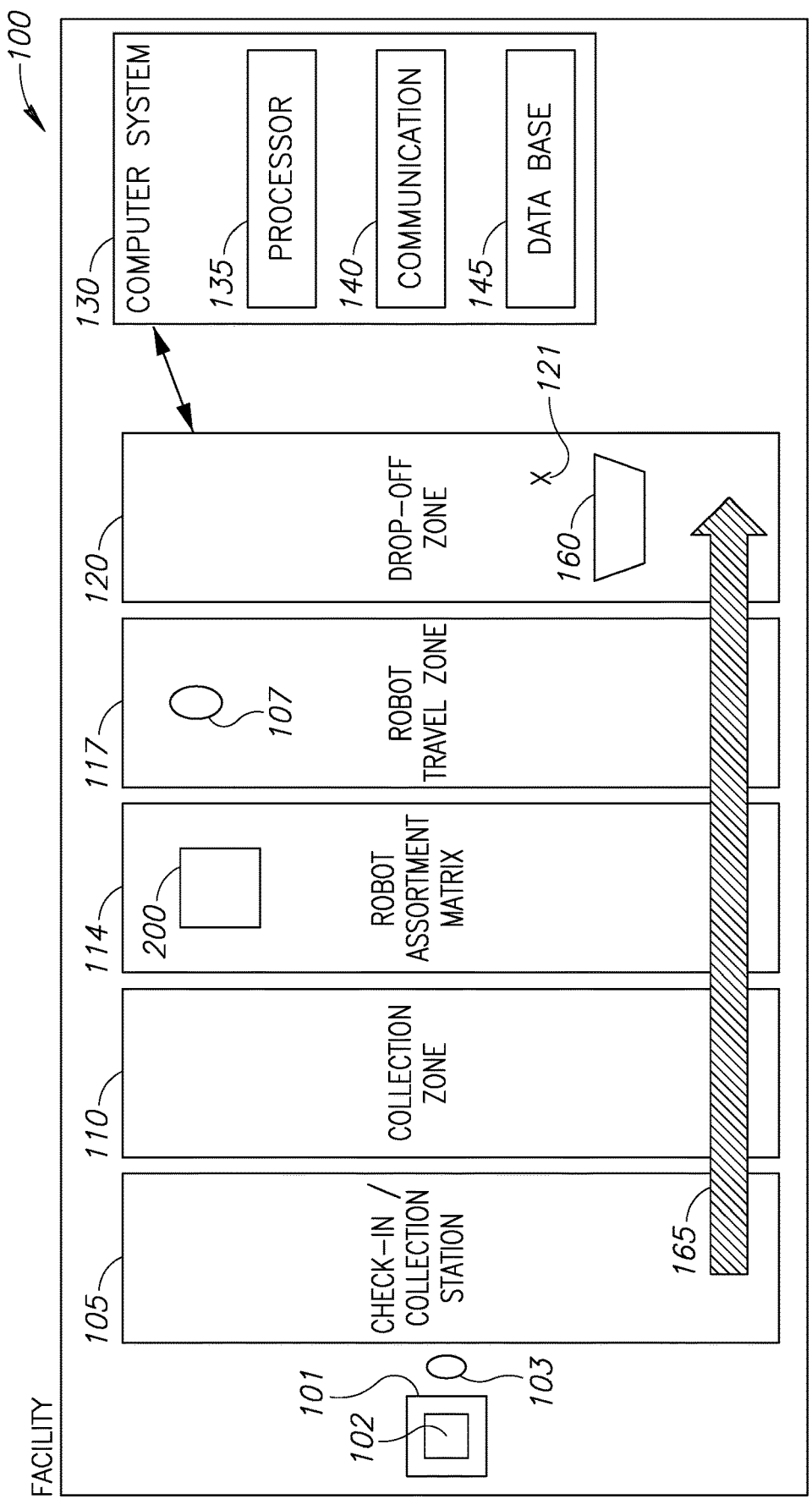
FIG. 1 schematically illustrates a facility configured for automated transportation of items therethrough, according to certain exemplary embodiments.

Identical, duplicate, equivalent or similar structures, elements or parts that appear in one or more drawings are generally labeled with the same reference numeral, optionally with an additional letter or letters to distinguish between similar entities or variants of entities, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views. References to previously presented elements are implied without necessarily further citing the drawing or description in which they appear.

DETAILED DESCRIPTION

Disclosed herein is a system and method for transporting of items through a facility, according to certain exemplary embodiments.

FIG. 1 schematically illustrates a facility 100 for sorting and transportation of one or more items 101 therethrough, according to certain exemplary embodiments. One or more items 101 travel through facility 100 as represented by directional arrow, referenced generally 165. Facility 100 includes one or more check-in stations 105 for receiving and processing the one or more items 101. At check-in station 105, information about the one or more items 101 is collected to facilitate identifying and tracking the one or more items 101 during their travel throughout facility 100. By way of example, information about item 101 is obtained at check-in area 105 by scanning an item tag 102 attached to item 101 or receiving the information from a radio frequency ("RF") chip attached to item 101, or through manual input of the information by a clerk 103 operating check-in station 105. From check-in station 105, each item 101 of the one or more items 101 is individually transferred to a collection zone 110 of facility 100, in which a single item 101 of the one or more items 101 is loaded onto a robot 115. The robot 115, carrying single item 101, is directed to a robot assortment matrix 114 of facility 100. At robot assortment matrix 114, robot 115, along with a plurality of robots 115 each carrying a single item 101, is sorted and arranged in preparation to travel through a robot travel zone 117 of facility, as described in conjunction with FIGS. 6A-6F and FIGS. 8A-8D. Robot 115 travels through robot travel zone 117 according to a predetermined queue and route to an automated cart 160 or to a container 852 or the like. Once robot 115 arrives adjacent to automated cart 160 or the like, it is positioned to facilitate transfer of single item 101 from robot 115 into automated cart 160 or loaded into container by porters. Automated cart 160 or container are configured to carry one or more items 101, received from one or more robots 115. Automated cart 160 carries items 101 through a drop-off zone 120 of facility 100 to a designated location 121. From designated location 121, item 101 is removed from automated cart 160 and can be stored, transferred for further travel, collected by an owner of item 101 or the like.

Facility 100 includes a computer system 130, which in certain exemplary embodiments can be a server, a central computer, cloud server or the like. System 130 is configured to manage the transportation of item 101 through facility 100 as described in conjunction with FIGS. 6A-6F, 7A-7F and 8A-8D. Computer system 130 includes a communication unit 140 configured to communicate with robot 115, automated cart 160, check-in station 105, other areas of facility 100 or the like and with other Central Computer Systems in a global network. Computer system 130 includes one or more processing units 135 configured to execute a computer readable program that includes operations for taxing items 101 through facility 100. Computer system 130 includes a database 145 for storing item information, robot information, automated cart information, facility information and/or the like. Facility 100 is described by way of example; a similar layout can be used for airports, bus terminals, train terminals, warehouses, and other locations that handle the sorting and routing of items from one or more check-in points to various destinations or various pick-up and/or storage locations.

It is appreciated by one skilled in the art that the system and method disclosed herein facilitate the reduction of human contact with the items 101 in transit and dispersed thereby reducing the risk of items 101 carrying contagions, viruses and bacteria thereby reducing the risk of people getting infected and sick through handling of the items 101. The reduced, if any, contact with porters throughout the travel of items 101 through facility 100 reduces the risk that people handling the items 101 will become infected. This is furthermore relevant in ports of travel, such as airports, bus stations, train stations and or the like. The dispersal of items 101 disclosed herein reduces the number of individuals touching items 101 and the manner in which the passengers collect items 101 from automated carts 160 reduces the contact between passengers and the need to be close thereby reducing the risk of passengers transferring diseases while collecting luggage.

Figure 2:
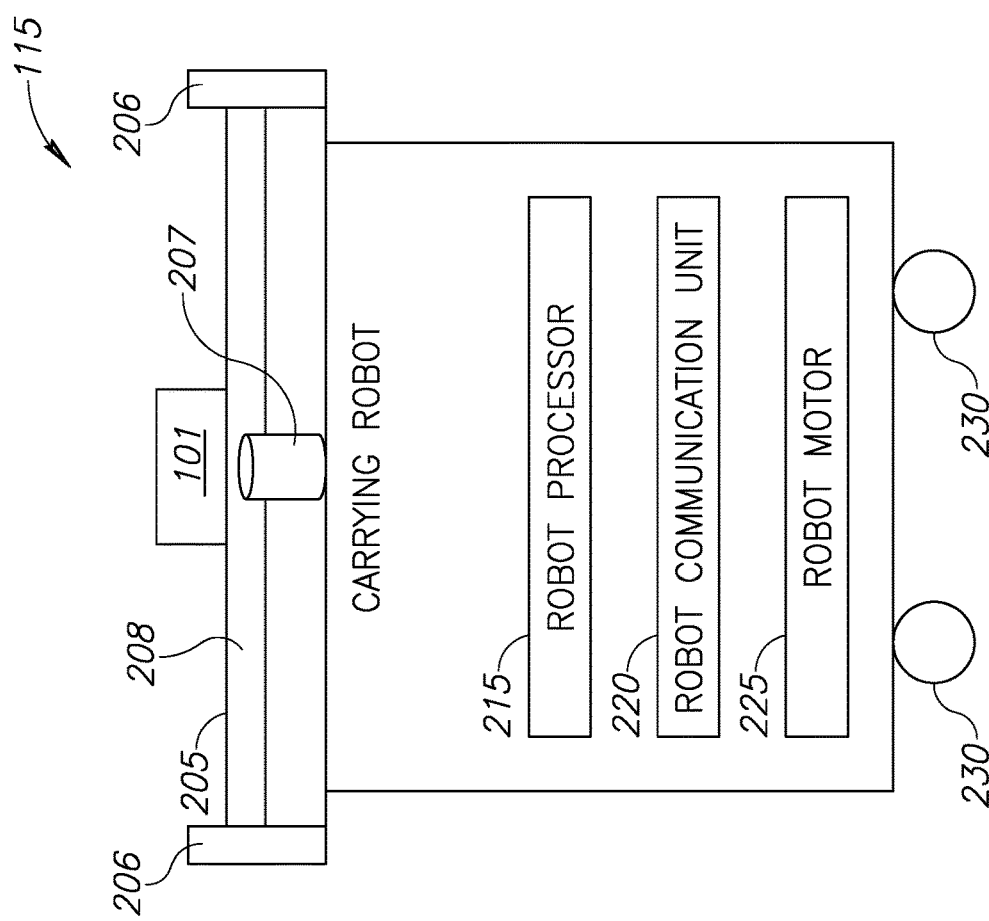
FIG. 2 schematically illustrates a robot of the facility, according to certain exemplary embodiments.

Reference is now made to FIG. 2, schematically illustrating a robot 115 of facility 100, according to certain exemplary embodiments. It is appreciated by one skilled in the art that robot 115 represents any number of robots 115 used as disclosed herein. Robot 115 includes a tray 205 for carrying of item 101. In some embodiments, tray 205 can have a width within a range of 60-80 centimeters ("cm"), a length within a range of 80-100 cm. In some embodiments, tray 205 can have edges 206 with a height within a range of 20-50 cm to prevent item 101 or parts of item 101, such as bands, ropes, or the like, from falling off of tray 205. In certain embodiments, tray 205 can include a conveyor belt 208 configured to facilitate loading and unloading item 101 onto and from tray 205. Tray 205 is detachable and can be lifted or lowered.

Robot 115 includes a robot processor 215 configured to operate robot 115. Robot 115 includes a communication unit 220 configured to communicate with central system 130 (FIG. 1). Robot 115 can include a hinge 207 operative to rotate tray 205 for unloading item 101, for example, into automated cart 160 (FIG. 1). Robot 115 includes a motor 225 operative to actuate robot wheels 230 to enable robot 115 to move throughout facility 100.

Figure 3:
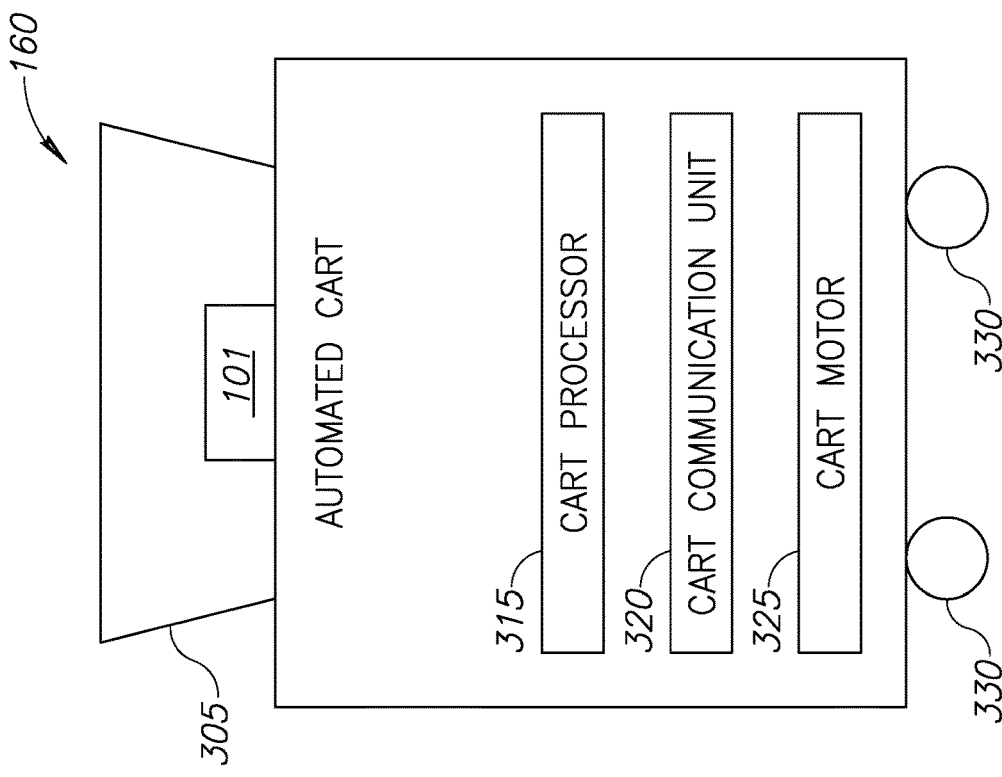
FIG. 3 schematically illustrates an automated cart of the facility, according to certain exemplary embodiments.

FIG. 3 schematically illustrates automated cart 160 of facility 100 (FIG. 1), according to certain exemplary embodiments. It is appreciated by one skilled in the art that automated cart 160 represents any number of automated carts used as disclosed herein. Automated cart 160 includes a bin 305 for carrying one or more items 101. By way of example, the one or more items 101 can be associated together such as belonging to the same person, travelling to a common destination, being stored together or the like. Bin 305 is detachable and can be lifted or lowered. Bin 305 can be put down on a scaffold (not shown) to provide support when heavy items are loaded and unloaded from bin 305, and to prevent damage to robot 115. In certain embodiments, bin 305 can include a conveyor belt (not shown) at a surface of bin 305 operative to move items 101 thereby providing additional space for additional items that need to be loaded into bin 305.

Automated cart 160 includes a cart processor 315 configured to operate automated cart 160. Automated cart 160 includes a communication unit 320 configured to enable automated cart 160 to communicate with computer system 130 (FIG. 1). Automated cart 160 includes a cart motor 325 configured to actuate cart-wheels 330 thereby enabling automated cart 160 to travel in facility 100 (FIG. 1).

Figure 4:
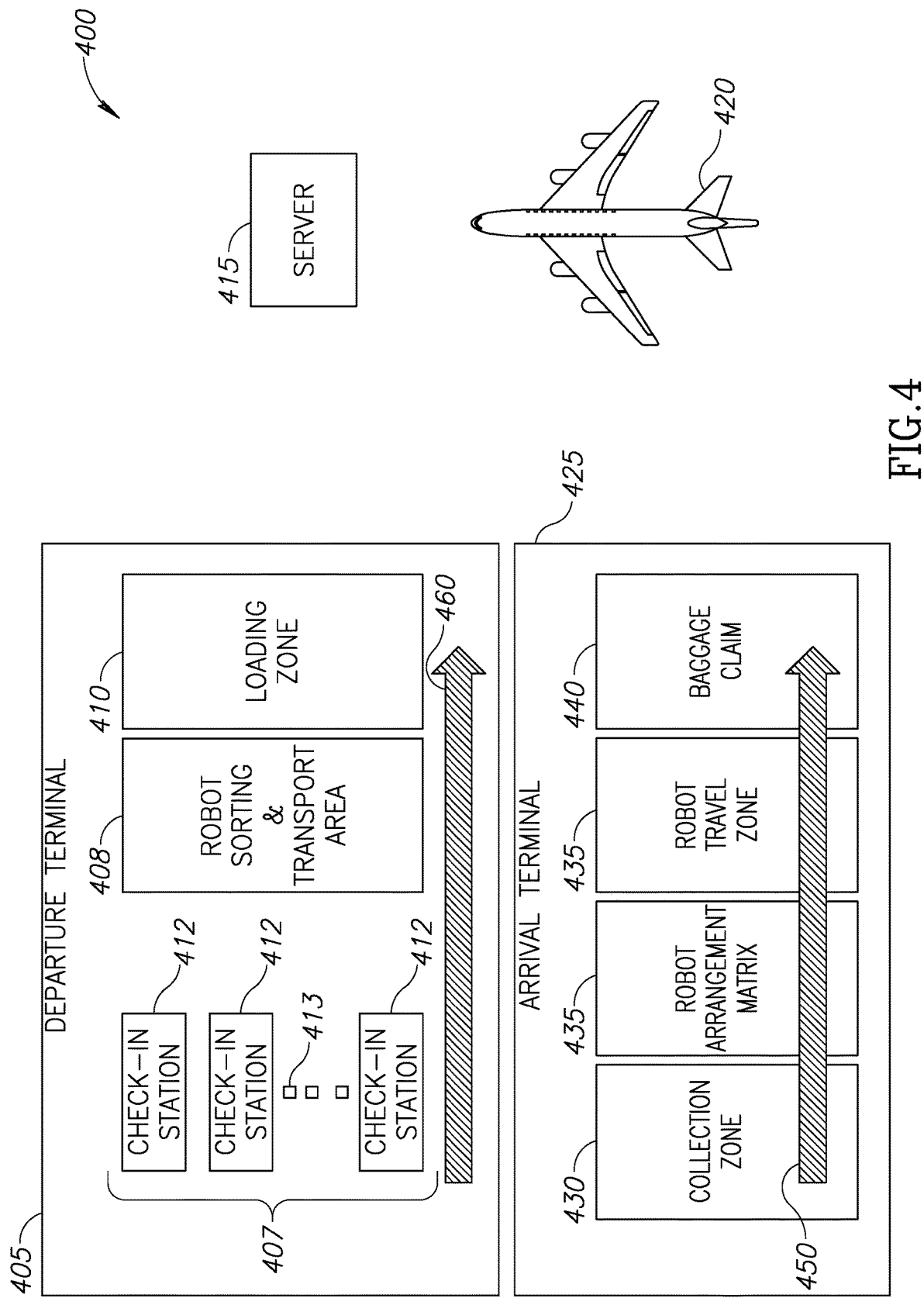
FIG. 4 schematically illustrates an airport terminal utilizing automated transportation of the items therethrough, according to certain exemplary embodiments.

Reference is now made to FIG. 4, which schematically illustrates an airport terminal 400 implementing the automated item transportation of facility 100 (FIG. 1) in a departure terminal 405 and in an arrival terminal 425 of airport 400, in accordance with certain exemplary embodiments. Airport terminal 400 is provided as a general example of an airport terminal and is used to describe as one exemplary embodiment of the disclosed subject matter. Departure terminal 405 includes a check-in area 407, corresponding to check-in area 105 (FIG. 1). Check-in area 407 includes one or more check-in stations 412, illustrated as three instances of a check-in station 412, representing any number of check-in stations 412, as indicated by dashed lines 413 and as described in conjunction with FIG. 8B. Airport terminal 400 includes a robot sorting and transport area 408 and loading zone 410 that are described in conjunction with FIGS. 8A-8D. One or more items 101 (FIG. 1) travel through departure terminal 405 as represented by directional arrow, referenced generally 460, representing the processing of item 101 and distributed to a designated airplane 420 according to the destination of the one or more items 101.

Airport terminal 400 includes arrival terminal 425, which is configured to implement facility 100 for automated transportation of one or more items 101. Arrival terminal includes a collection zone 430 for receiving the items from airplane 420, robot's arrangement matrix and travel zone 435 and a baggage claim 440 corresponding to the same general areas in facility 100, with baggage claim 440 corresponding to pick-up and storage area 120 (FIG. 1). One or more items 101 travel through arrival terminal 425 as represented by directional arrow, referenced generally 450.

Airport terminal 400 is described by way of example, a similar layout may be used for train terminals, warehouses, and other locations that handle the sorting and routing of parcels from at least one point-of-origin, check-in station, or a plurality of point-of-origin check-in stations to various destinations or various pick-up locations.

Figure 5:
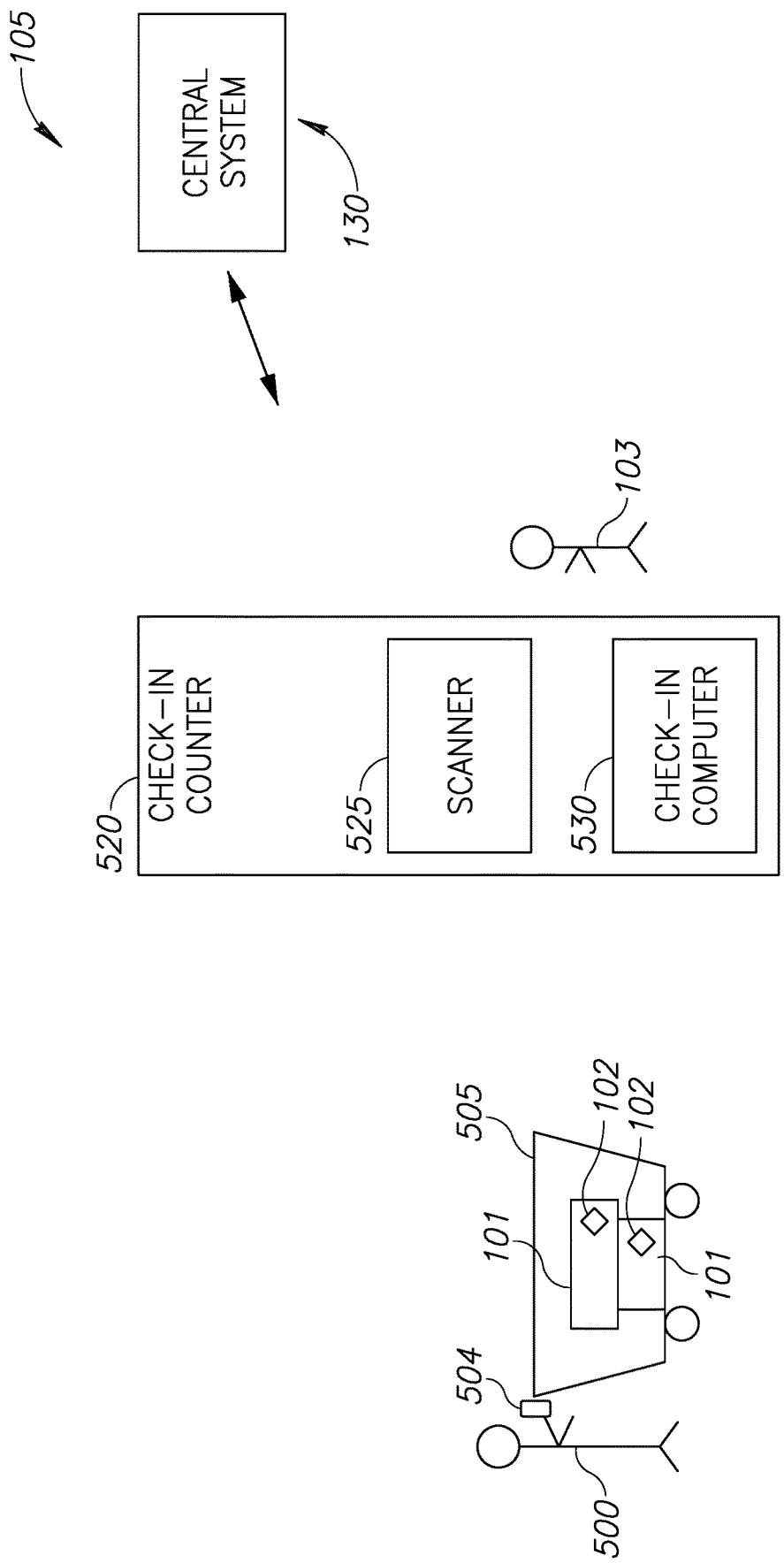
FIG. 5 schematically illustrates a check-in station of the facility, according to certain embodiments.

Reference is now made to FIG. 5, schematically illustrating a check-in station 105, according to certain exemplary embodiments, and as further described in conjunction with FIGS. 8A-8D. A person 500 brings one or more items 101 (FIG. 1), to check-in station 105 to be received and processed. In some embodiments, check-in station 105 includes a check in-counter 520 at which items 101 can be received by clerk 103 or processed by the items owner, scanned identified and transferred for processing. In some embodiments, clerk 103 or items owner checks in the item 101 by inserting the item information into a check-in computer 530, for example, by typing the item information on a keyboard (not shown). Check-in station 105 can include a scanner 525 configured to scan identification tags 102 to obtain information of each item 101. The information can include a unique identification number having numbers, letters and characters in combination which is solely paired with the item tag 102. Identification information is provided to a central system 130 thereby allowing information to be stored in database 145 (FIG. 1), transmitted to other areas of facility 100 (FIG. 1) or to other remotely located facilities, for example, to airport terminal 400 (FIG. 4) and to other airport terminals in other cities and/or countries or to a global server.

In some embodiments, person 500 receives a check-in receipt for each baggage he handed over (not shown). The receipt has a R-code that keeps identification data about luggage, passenger, airline and flight.

In certain embodiments, person 500 carries a smart device 504, for example, a smartphone, a tablet or the like. Immediately after check-in, system sends to passenger a link to a special dedicated application. Passenger has to load app to his device. Passenger has to scan one of the receipts in his hands using the app or input data into the application that is later used in baggage claim at a destination location as described in conjunction with FIG. 6F.

Figure 6A:
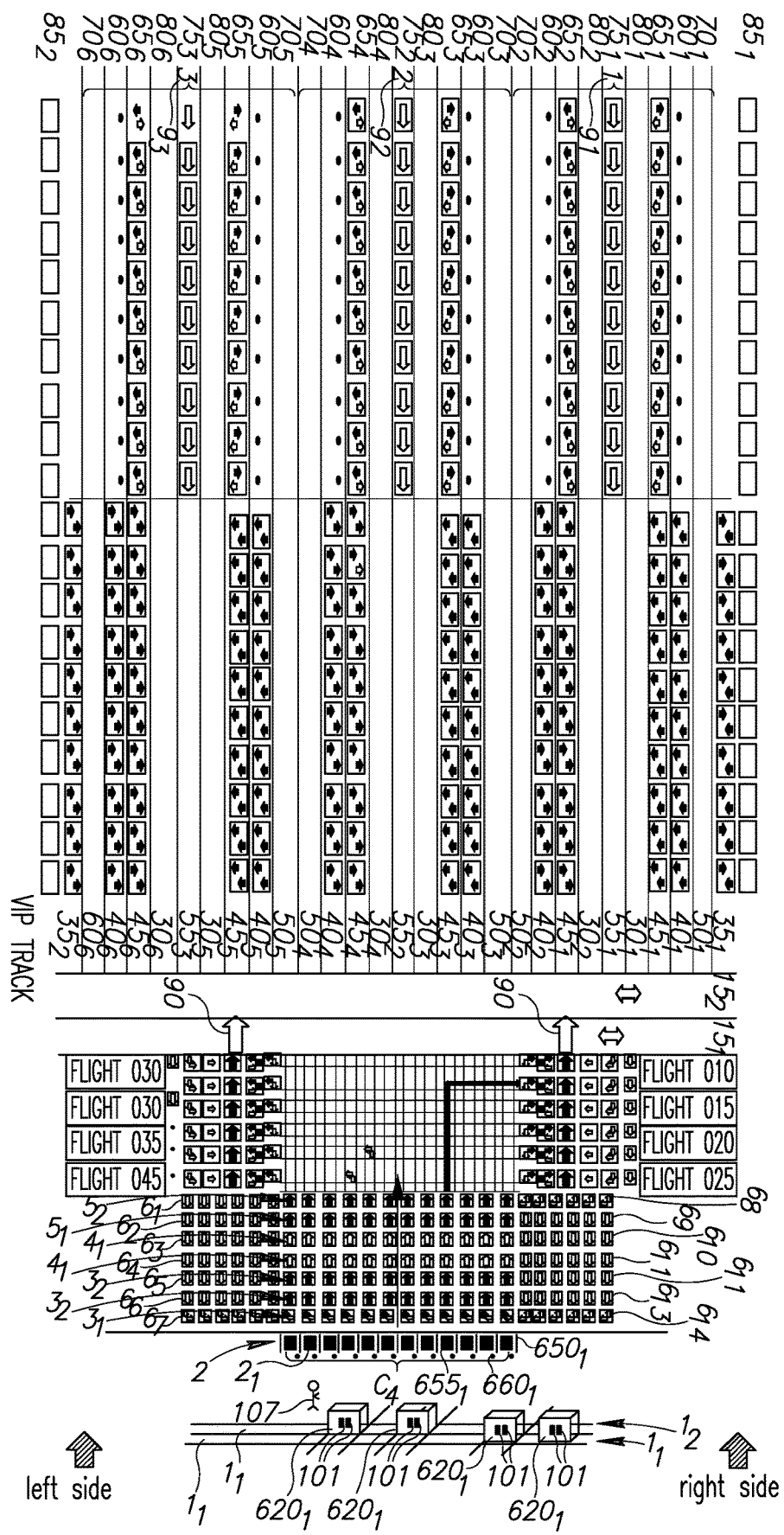
FIG. 6A schematically illustrates an arrival terminal, according to certain exemplary embodiments.

FIG. 6A schematically illustrates arrival terminal 425, according to certain exemplary embodiments.

Figure 6B:
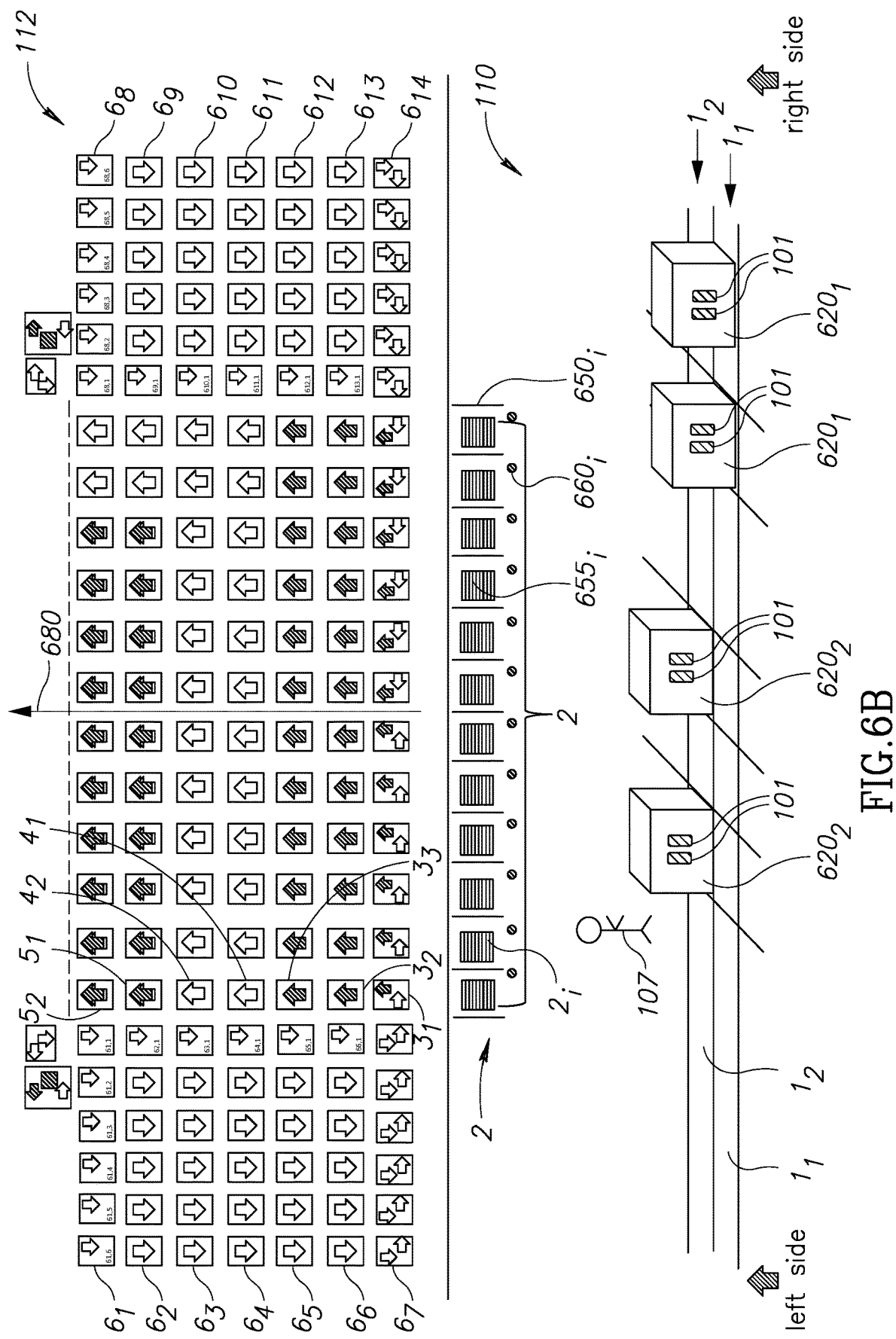
FIG. 6B schematically illustrates a collection zone and a robot assembly matrix of the facility, according to certain exemplary embodiments.

FIG. 6B schematically illustrate collection zone 110 and robot assembly matrix zone 112 for processing items 101, according to certain exemplary embodiments. Collection zone 110 includes track 11 for bringing containers to collection zone 110. In some embodiments, track 11 is a moving track to facilitate expedited movement of containers. Collection zone 110 includes track 12 for stationing containers near the porters. In some embodiments, the containers are directed to track 12 from track 11.

Item-bins, referenced generally $620_1$, are loaded with one or more items 101 that are transported to collection zone 110 and arranged along a holding track 11. Items bins $620_1$, positioned on track 11 are waiting in a queue prior to transfer to operation track 12. When transferred to 12 they are identified as $620_2$. Once item bins $620_2$ are emptied, additional item bins $620_1$ are transferred from holding track 11 to working track 12. Items bins $620_2$ are placed on tracks 12 according to the order at which item bins arrive at collection zone 110 to facilitate a first in first out processing of items 101.

Item bins $620_i$ can be brought onto holding track 11 and operation track 12 by porters 107 (FIG. 6), carrying robots (not shown), conveyor belt (not shown), and/or the like.

Collection zone 110 includes track 2 having one or more sturdy permanent cells. Items 101 removed from item bins $620_2$ are loaded into a loading track 2. Track 2 includes sturdy permanent cells. Loading track 2 includes loading cells, referenced generally $2_i$. A single item 101 is placed onto each loading cell $2_i$. In certain embodiments, by way of example, each loading cell can have a width within a range of 60-80 cm and a length within a range of 80-100 cm. Loading cells $2_i$ are separated by partitions, referenced generally $650_i$, which facilitate placement of items 101 into loading cells $2_i$ without items 101 falling out of loading cells $2_i$ or lying one on top of the other. Where porters 107 are transferring items 101 from item bins $620_2$ into loading cells $2_i$, porters 107 do not have to worry about the force with which items 101 are placed into loading cells $2_i$. Each loading cell $2_i$ includes a loading cell conveyor belt $655_i$, configured to load item 101 onto robot 115. Placement of item 101 in loading cell $2_i$ prior to loading item 101 onto robot 115 prevents damage to robot 115. Loading cell $2_i$ can include a loading scanner $660_i$ configured to scan item tag 102 (FIG. 1) when item 101 is placed in loading cells $2_i$. Alternatively, if item 101 has ID topic such as an RF-chip, then identification information is automatically transmitted to central system.

In certain exemplary embodiments, to maintain a symmetry and efficiency of loading items 101 onto loading track 2, items 101 are loaded from an external loading cell $2_i$ until a central loading cell $2_i$. In some embodiments, two porters 107 load items 101 at the same time, for example, the porters commence loading items 101 from the edge loading cells $2_i$ towards the center loadings cells $2_i$.

Robot assembly matrix zone 112 includes track $3_1$ to which unloaded robots 115 from track $6_7$ arrive from the left and fill the left half of track $3_1$, and unloaded robots 115 from track $6_{14}$ arrive and fill the right half of track $3_1$.

Robots 115 from track $3_1$ are directed by system 100 to tracks $3_2$ and $3_3$. Robots 115 arriving from track $3_1$ to track $3_3$ stop and wait for instructions from the central system. Robots 115 from track $3_3$ move simultaneously as is explained in conjunction with FIGS. 7B-7D.

Figure 7A:
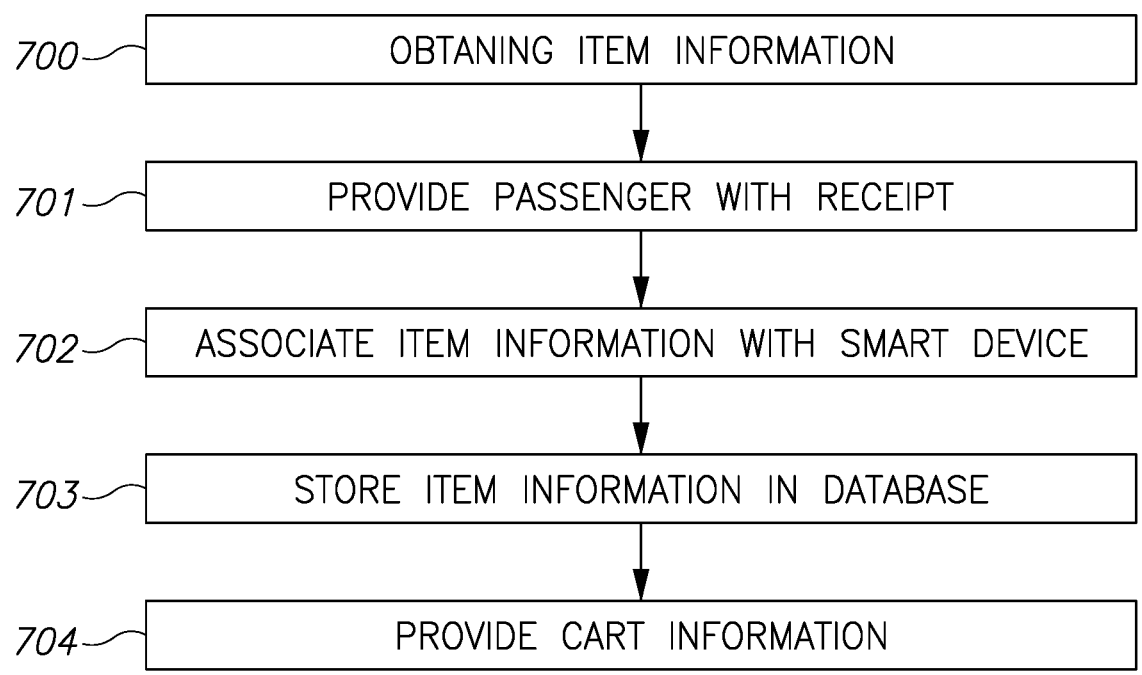
FIG. 7A outlines operations for associating a person 500 (FIG. 5) with items 101 (FIG. 1), according to certain embodiments.
Figure 7B:
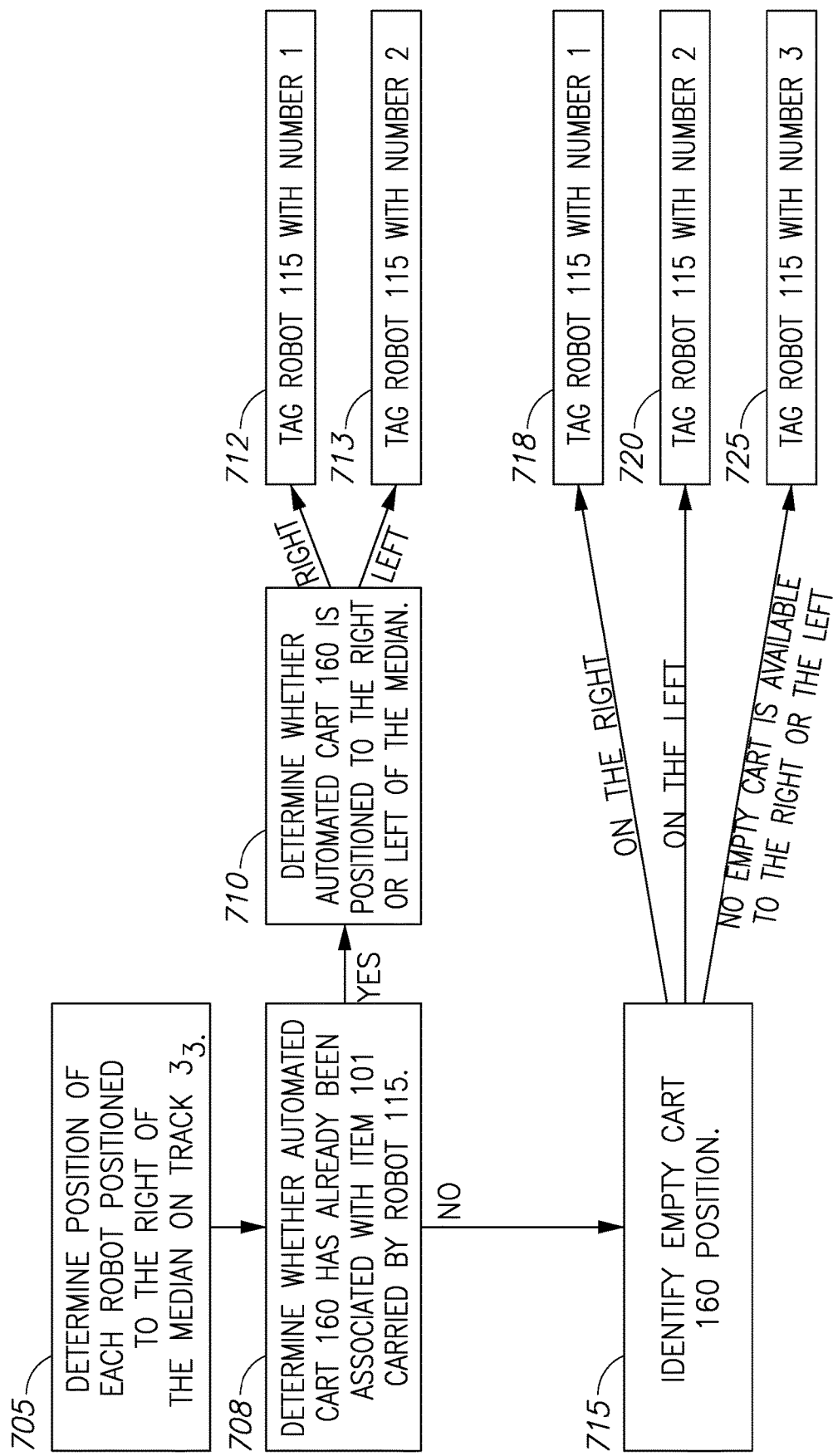
FIGS. 7B-7D outline operations of robot processing, according to certain exemplary embodiments.
Figure 7C:
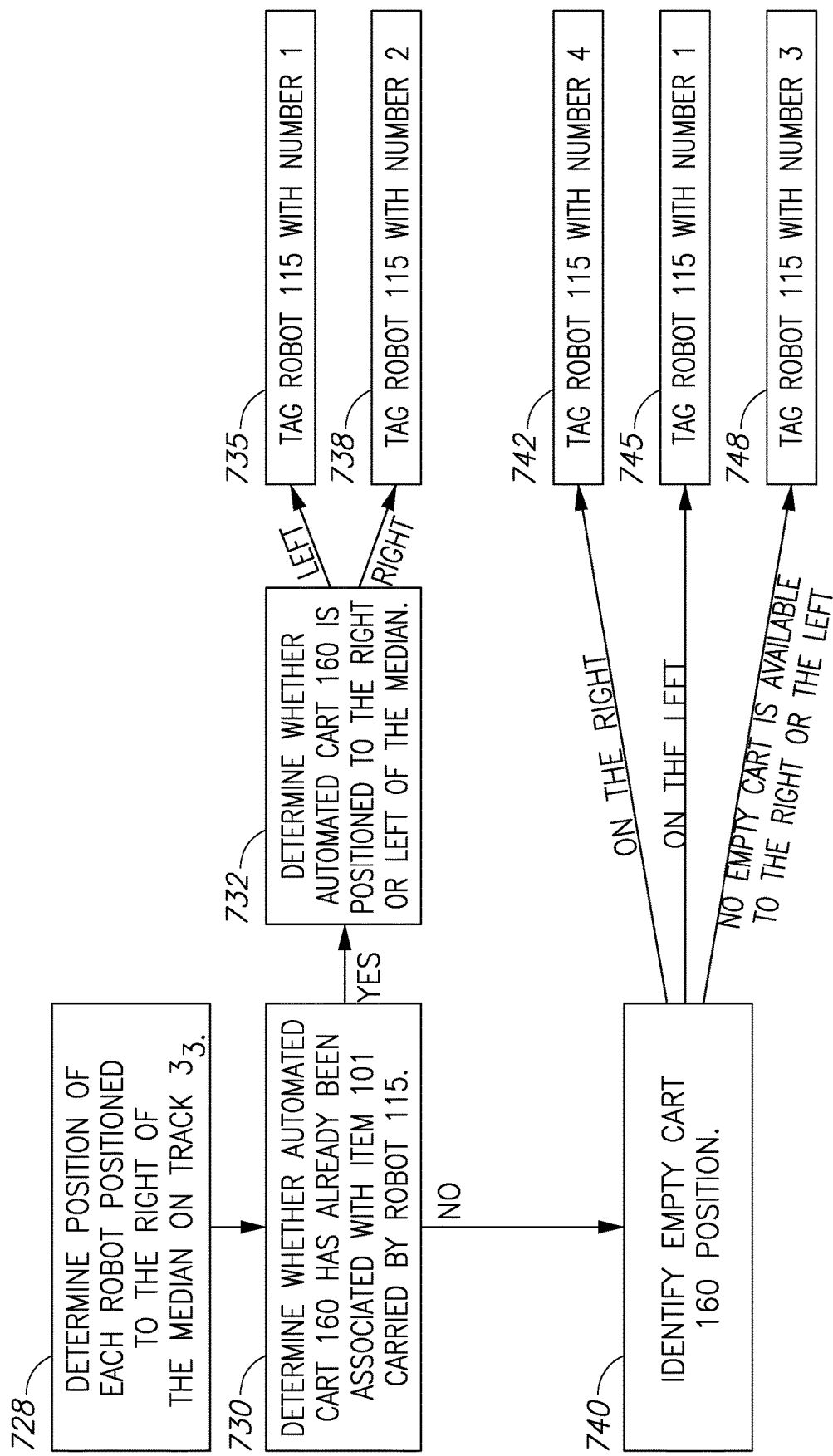
Figure 7D:
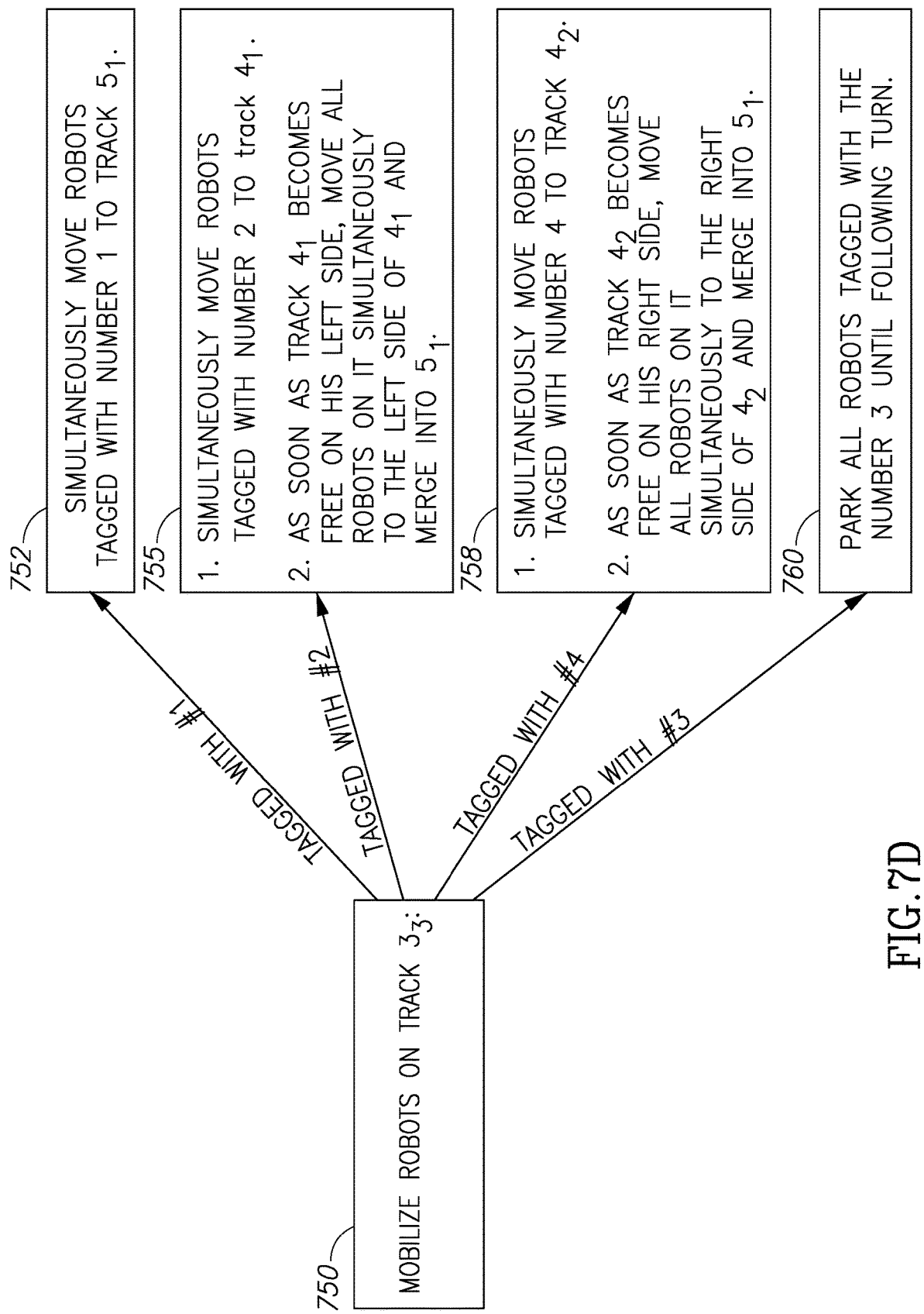

Robot assembly matrix zone 112 includes tracks $4_1$ and $4_2$ to assist in preliminary sorting of robots 115 as is explained in conjunction with FIGS. 7B-7D.

Robot assembly matrix zone 112 includes tracks $5_1$ and $5_2$, that can represent any number of tracks $5_i$ in which robots 115 arrive at track $5_1$ after preliminary sorting of robots 115. When track $5_2$ is empty, robots 115 positioned along track $5_1$ are instructed to step simultaneously into track $5_2$. Robots 115 move and wait on track $5_2$ for instructions from system. At a predetermined command, robots 115 enter the sorting system as described in conjunction with FIG. 6C.

Figure 6C:
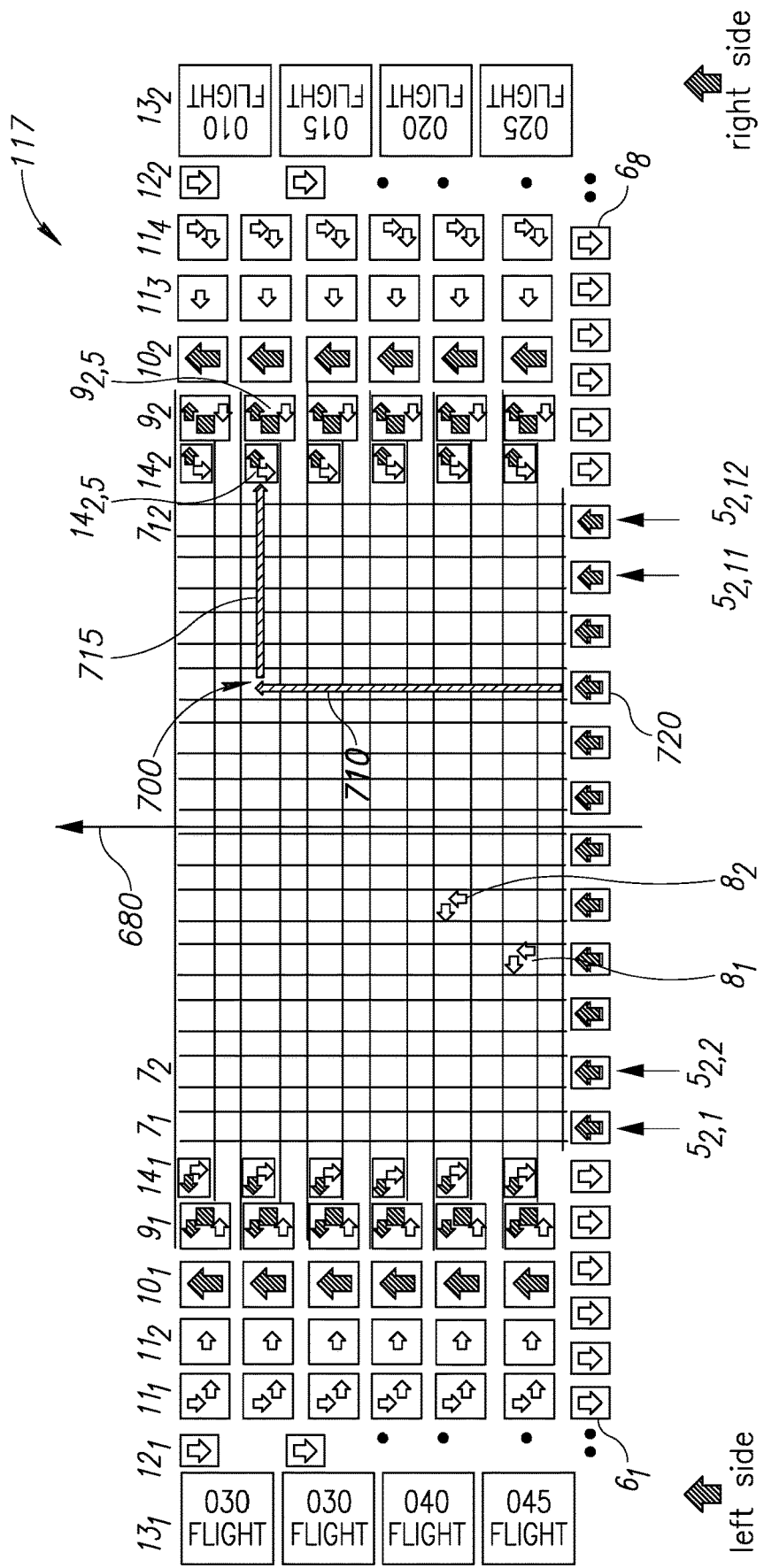
FIG. 6C schematically illustrates a robot sorting travel area of the facility, according to certain embodiments.

Tracks $6_1$-$6_{14}$ are filled with unloaded robots arriving from tracks $14_i$ and $12_i$ (FIG. 6B and FIG. 6C). Robots 115 can move right, left and/or down between tracks $6_1$-$6_{14}$, thereby creating room for additional arriving unloaded robots 115. Cells—arranged from the left—$6_{1,1}$, $6_{2,1}$, $6_{3,1}$, $6_{4,1}$, $6_{5,1}$ and $6_{6,1}$, and cells—from the right—$6_{8,1}$, $6_{9,1}$, $6_{10,1}$, $6_{11,1}$, $6_{12,1}$ and $6_{13,1}$ are clear to enable a flow of robots 115 from $14_i$. Immediately after coming from $14_i$, robots 115 move to the left within tracks $6_1$-$6_6$ as left as possible and move right within tracks $6_8$-$6_{13}$ as right as possible.

Unloaded robots from tracks $6_7$ and $6_{14}$ move right and left to track $3_1$ such that one robot 115 is adjacent to one loading cell $2_i$. Item 101, positioned in loading cell $2_i$, is loaded onto robot 115 adjacent to loading cell $2_i$. From loading cell $3_{1,i}$, robot 115 moves to track $3_3$. When track $3_3$ is fully occupied by loaded robots, or partially full, depending on the cycle, system executes the operations as outlined in FIGS. 7B-7D. Upon completion of the operations outlined in FIGS. 7B-7D, robots 115 coming from $3_3$, are positioned on track $5_1$. When track $5_2$ is clear, robots 115 from track $5_1$ get simultaneously moved to track $5_2$. When sorting system is clear of robots 115, then robots 115 positioned on track $5_2$ get simultaneously into the sorting system.

FIG. 6C schematically illustrates a robot sorting area 117, according to certain embodiments. Robot sorting area 117 includes tracks $7_i$ and $8_i$, which are routed along Y-paths and X-paths according to a cartesian coordinate system. Tracks $7_i$ and $8_i$ direct robots 115 carrying item 101 on track $5_2$ to the designated cart 160 that is parking on track $9_i$.

All robots 115 on track $5_2$ are mobilized simultaneously along the vertical tracks $7_i$ (Y). Once the robots 115 have completed their track along the Y-path, all robots 115 proceed simultaneously along tracks $8_i$ (X), which leads the robots 115 near the designated carts. Once the robots 115 reach the designated cart, item 101 is loaded into the designated cart 160 from the adjacent robot.

Robot sorting area 117 includes tracks $14_i$ on which the loaded robots 115 stop, unload their parcel 101 into carts 160 by lifting tray 205, operating conveyor belt 208 and go back to track $6_i$ through tracks $14_i$.

Robot sorting area 117 includes tracks $9_i$ on which empty carts wait to receive items 101 from robots 115. The carts arrive from tracks $11_i$. through tracks $10_i$. Once all the items 101 designated for the cart are transferred, the cart proceed to tracks $10_i$ and from there to tracks $15_i$.

Robot sorting area 117 includes tracks $12_i$ in which robots 115 carrying item 101 that is designated for a connecting flight arrive. Once an item destination is determined robots 115 cross sorting zone and through tracks $15_i$ proceed onto track $12_i$. On track $12_i$ robot 115 unload parcel 101 into a large container, by lifting tray 205, operating conveyor belt 208. Robot 115 proceeds through tracks $12_i$ to tracks $6_i$ which holds unloaded robots 115. Each large container is designated to carry items for a different flight. Different containers can be designated to the same flight. In some embodiments, the large containers are dislocated by robots.

Immediately after a cell in tracks $9_i$ is evacuated, an empty cart 160 from tracks $11_2$ or $11_3$ passes through track $10_i$ and comes onto tracks $9_i$. From track $11_i$, a cart passes to track $11_2$ for next use and from track $11_4$ a cart passes to track $11_3$.

Figure 6D:
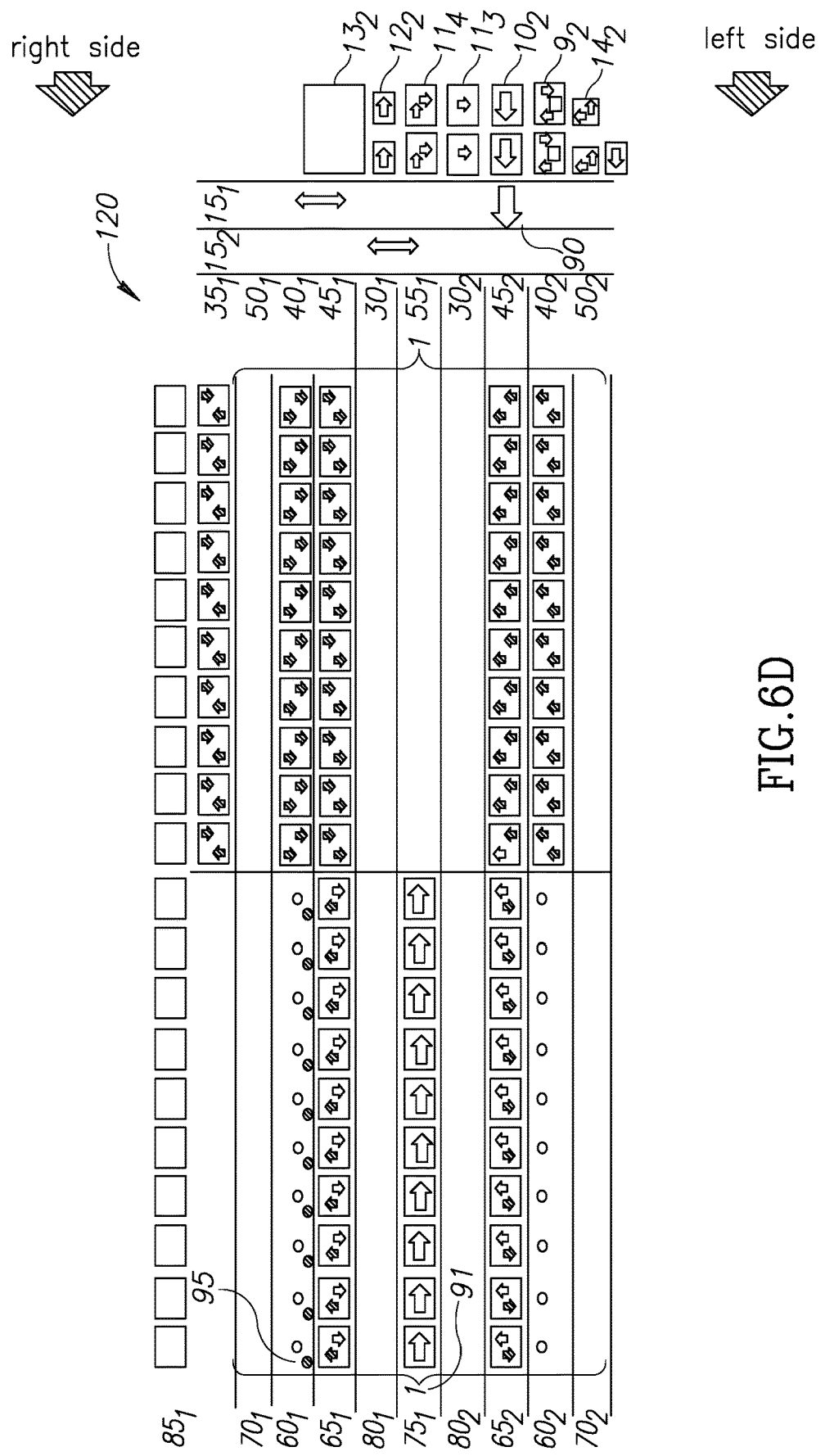
FIG. 6D-6F schematically illustrates a drop-off zone of the facility, according to certain exemplary embodiments.
Figure 6E:
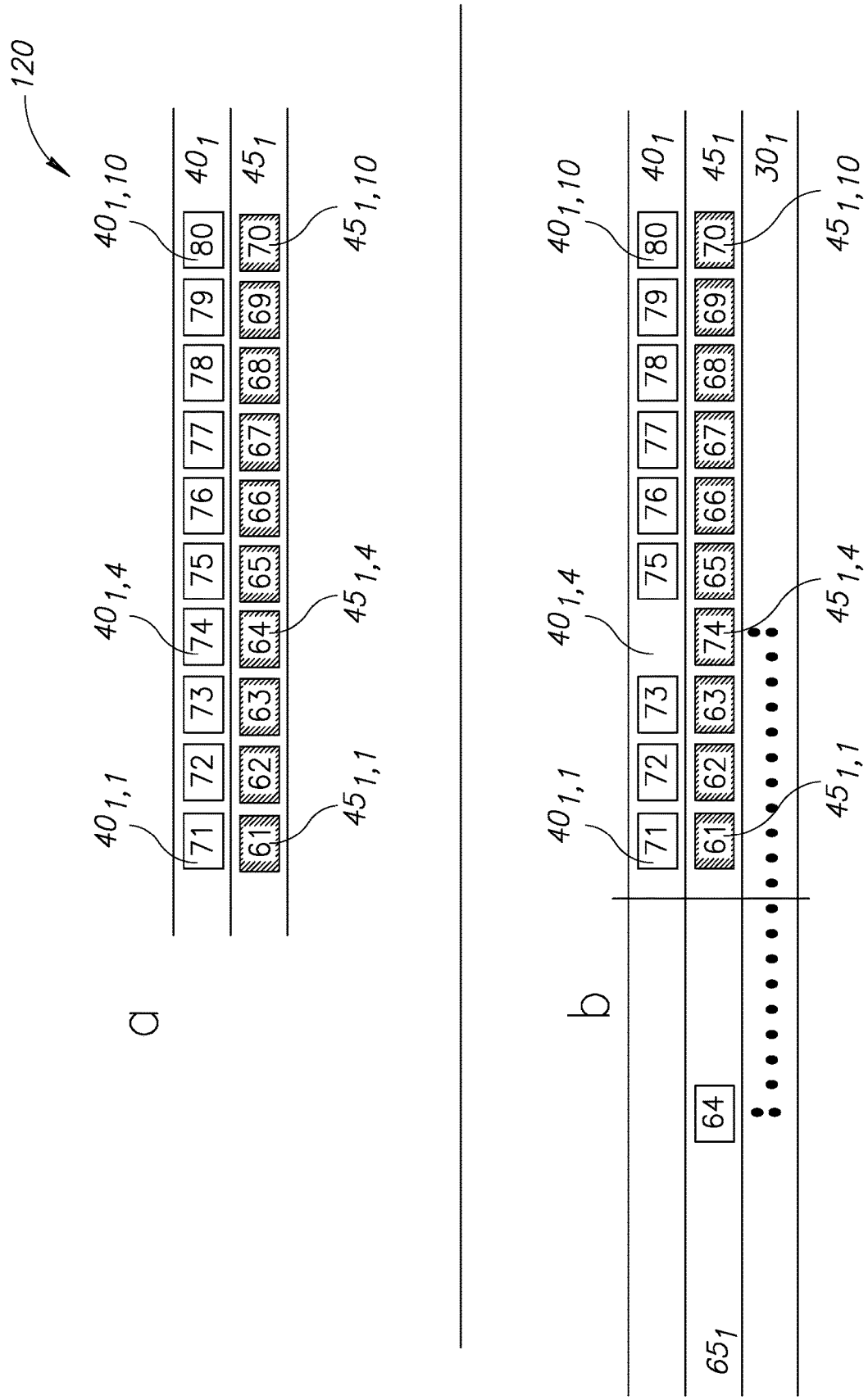
Figure 6F:
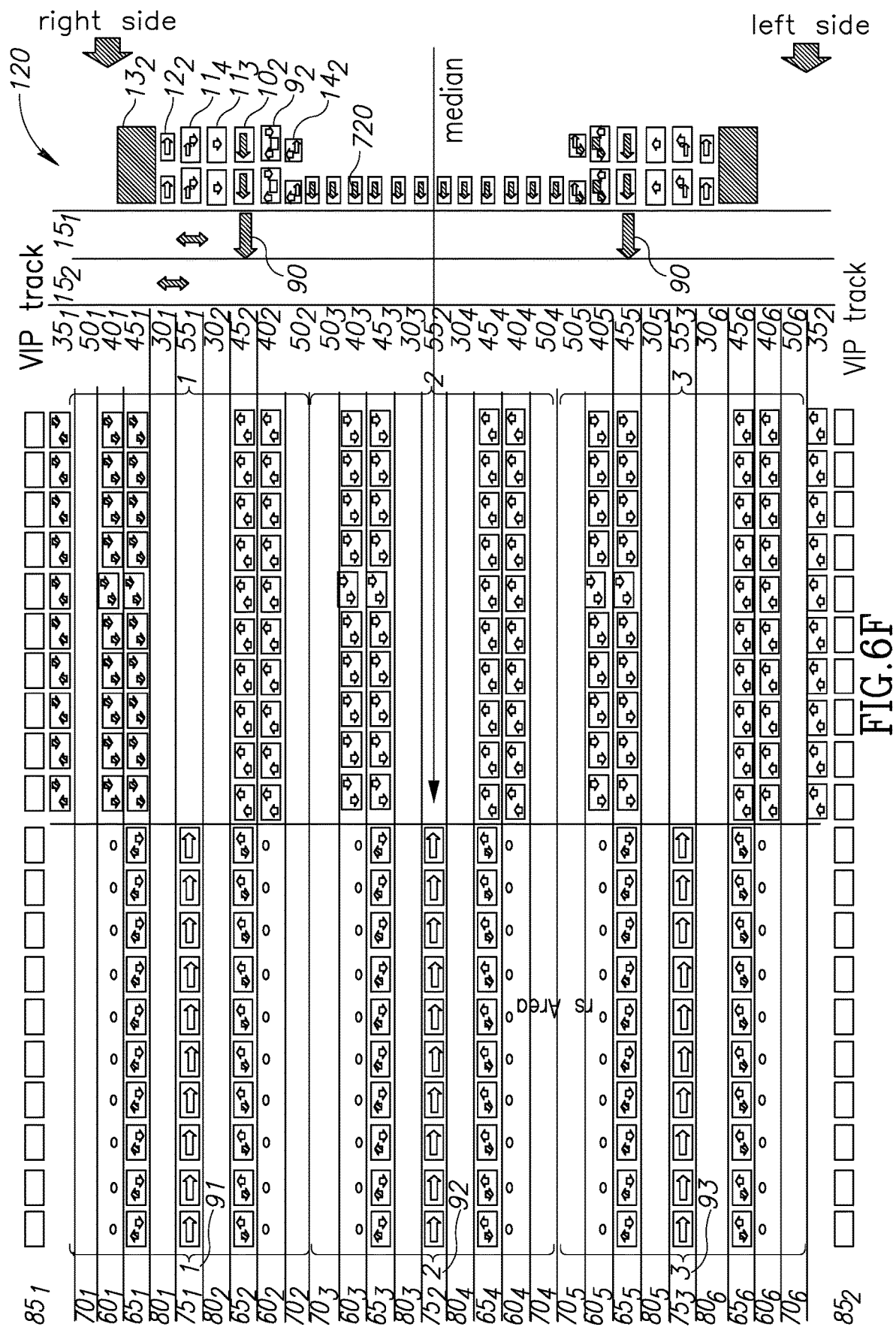

FIGS. 6D-6F schematically illustrate drop-off zone 120, according to certain exemplary embodiments.

Drop-off zone 120 includes tracks $15_1$, $15_2$ or $15_i$, which are used for transportation of robots 115 and carts 160 from sorting zone to storage zone and back to tracks $11_i$; from sorting zone to special purpose tracks, for example VIP tracks $85_i$ or the like and back to tracks $11_i$. No carts stop on these tracks.

Drop-off zone 120 includes tracks $50_i$, which are transporting tracks. No carts stop on these tracks. These tracks facilitate transportation of carts from the sorting zone to tracks $40_i$ through $15_i$.

Drop-off zone 120 includes tracks $40_i$ at which loaded carts 160 arrive. Carts 160 arrive through tracks $15_i$ and tracks $50_i$ according to predetermined logistics.

Drop-off zone 120 includes Tracks $45_i$ on which robots 115 arrive from tracks $40_i$ according to predetermined logistics.

Drop-off zone 120 includes tracks $30_i$ for transporting loaded carts from tracks $45_i$ to tracks $65_i$, through tracks $80_i$.

Drop-off zone 120 includes tracks $55_i$, which facilitate returning empty carts to sorting zone through tracks $15_i$.

Drop-off zone 120 includes tracks $35_i$ for temporary storage of carts 160 that wait for passengers for a predetermined amount of time when passengers do not arrive to collect items 101. In some embodiments, carts 160 wait on tracks $35_i$ until a passenger sends a message to the system via special dedicated application notifying it that he is on his way to passenger zone.

Drop-off zone 120 includes tracks $60_i$ that provide an area for travelers to reach carts 160.

Drop-off zone 120 includes tracks $65_i$ that are stationed opposite to the passengers and contain the loaded carts 160.

Drop-off zone 120 includes tracks $70_i$ for the movement of the passengers.

Drop-off zone 120 includes tracks $75_i$, which are transportation tracks for transportation of emptied carts 160 from the passengers' zone to the sorting zone through tracks $55_i$ and tracks $15_i$.

Drop-off zone 120 includes tracks $80_i$ that facilitate moving carts 160 from tracks $45_i$ to tracks $65_i$ through tracks $30_i$, and for transferring emptied carts from tracks $65_i$ to tracks $75_i$. No carts stop on these tracks.

Drop-off zone 120 includes tracks $85_1$, $85_2$ or $85_i$. These tracks are VIP tracks that can be used for predetermined designated uses. It is appreciated by one skilled by the art that it is possible to add tracks from right and left according to the necessities of facility 100 (FIG. 1) to increase the efficiency and functionality of the dispersal of the items 115.

In some embodiments, drop-off zone 120 can include additional tracks that are designated to provide special services. In some embodiments, automated carts 160 can direct luggage to a designated location at which items are arranged for special delivery by the company to a provided location, such as a residence or place of business. In certain examples, passenger provides the location details at check in station during processing of the items 101 or to stewards at destination port.

These additional tracks are not dedicated to the services mentioned in an absolute manner. Through software they can be temporarily converted to different services.

Facility 120 (FIG. 6F) is divided into three parts that are parallels. First part is identified by 91 and displayed apart and magnified in FIG. 6D. Second part is identified by 92 and third part by 93. Each part of the three parts is divided into two subparts: an upper subpart and a lower subpart. In between the parts is track $75_i$ and track $55_i$. Reference is made to the upper subpart of the first part (FIG. 6D). It includes tracks: $70_1$, $60_1$, $65_1$ and $80_1$ on one hand, and tracks: $50_1$, $40_1$, $45_1$ and $30_1$ on the other hand. The lower subpart includes tracks: $70_2$, $60_2$, $65_2$ and $80_2$ on one hand, and tracks: $50_2$, $40_2$, $45_2$ and $30_2$ on the other hand. The two subparts are discerned by their identification indexes, 1 and 2. It is appreciated by one skilled in the art that index "i" provides a generalization in the reference's numbers provided to reflect the correct index value. By way of example, when cart 160 arrives from track $15_i$ to track $50_1$, and until the cart is emptied and enters track $75_1$ then the index as to all the tracks that cart traverses, remains 1. When the cart arrives from track $15_i$ to track $50_2$ and until the cart is emptied and enters track $75_1$ then the index as to all the tracks that cart traverses, remains 2. So, the use of "i" as index in describing the path that the cart is doing is quite correct. The use of index "i" is also applicable in reference to the other tracks in part 1, such as tracks $50_i$, $40_i$, $45_i$ $30_i$, or the like.

Cart 160 arrives at storage zone on tracks $10_i$ and $15_i$. Before entering $15_i$ cart 160 has to stop at the end of track $10_i$. When one of the tracks $15_i$ is clear, and after system has identified the nearest free cell in one of tracks $40_i$, cart 160 is commanded to move to free track $15_i$, from there to track $50_i$, from there to track $40_i$, and get to the free cell on track $40_i$.

Referring now to FIG. 6D. In some embodiments, to every track $40_i$ a counter is attached having a running number. In some embodiments, the running number is a 'priority number'. Once cart 160 reaches the free cell on track $40_i$, system 130 assigns the next priority number that belongs to track $40_i$, to the next arriving cart 160. Parallel and adjacent to track $40_i$, is track $45_i$. Once a cell on track $45_i$ becomes available, then the cart 160 on the cell adjacent to it from track $40_i$, moves to the cell that becomes available on track $45_i$.

Once a cell becomes free on track $65_i$ which is the continuation of track $45_i$ then the priority number determines that, the cart 160 with the highest priority number, will be the one to come to the free cell on track $65_i$. Cart 160 from track $45_i$ start to step to this available cell through tracks $30_i$ and $80_i$. The highest priority number is the value 1, after 1 is 2 and on the like, thereby maintaining a "first in, first out" process.

Carts 160 are moved from storage area to passenger area once passengers inform the system 130 via a special dedicated application that they are present in the baggage claim 440 (FIG. 4).

This introductory action may cause a disruption in the 'priority number'. Let's explain how the 'priority number' will continue to run correctly in lanes $40_i$ and $45_i$.

Let's look to FIG. 6E (a), tracks $40_1$ and $45_1$. The numbers 61-80 displayed, are the priority numbers of the carts 160 that are positioned in these cells. By way of example, cell $45_{1,4}$ (FIG. 6E (a)) is assigned a priority number 64. Once a message has been received in the system 130 from the passenger whose items 101 are located in cell $45_{1,4}$, the system 130 gives cart 160 priority over other carts. For, example, the priority numbers with a priority over the number 64 are: 61, 62 and 63. As soon as cart 160 is moved from cell $45_{1,4}$ to track $65_1$ through track $30_1$ (FIG. 6E (b)), system moves cart 160 with priority number 74, from cell $40_{1,4}$ to cell $45_{1,4}$. Cart 160 with priority number 74 remains in this cell until its turn comes to be transferred to track $65_1$, For example, when all priority numbers 61 to 63 and 65 to 73 are exhausted. Cell $40_{1,4}$ remains vacant until it is its turn to receive a cart, i.e., until comes the moment, the system is assigning the priority number 84.

Back to FIG. 6D. In some embodiments, passenger must use scanner 95 to scan receipt in his possession, and after a green light above cart 160 cell is displayed by the system, traveler can take his luggage. After traveler took his luggage, and after the sensors detect that the cart 160 is empty, the cart 160 makes its way back to track $11_i$, the track holding the empty carts. Cart 160 steps to track $75_i$ through track $80_i$. From $75_i$ to $55_i$ and from $55_i$ to $15_i$ and arrives to $11_1$ or $11_4$, and from $11_1$ to $11_2$ and from $11_4$ to $11_3$.

In certain embodiments, when item 101 is in transition between facilities, for example in connection flights, mail parsing facilities, and/or the like, then item that has arrived at the sorting site and is destined for onward flights will make track $7_i$ to the end, and from there will reach track $12_i$, through tracks $15_i$. On track $13_i$, large containers are positioned. Each container is intended to transfer items 101 to a different flight. Several containers could be intended for the same flight. Robot 115 with item 101 on it, arrives at a flight container corresponding to the item 101 it is carrying, transfer the item into the container and continues its way through track $12_i$, and reaches track $6_i$ which is the storage for the unloaded robots. In certain embodiments, where facility 100 (FIG. 1) is a warehouse, containers can be arranged according to storage section of warehouse from which an employee can take and arrange the items on shelves.

In certain embodiments, carts 160 go from tracks $15_i$ to tracks $65_i$ without stopping in a storage location.

In some embodiments, drop off zone 120 includes tracks $15_i$. Once the robot 115 has been designated to tracks $15_i$, it can go to the storage site or to any other destination or track, on a right side or left side of tracks $15_i$, right and up or right and down to tracks $15_i$, left and up or left and down to tracks $15_i$, or get out of the system site and go to charge or lab for treatment or repair. In some embodiments, cart 160 is directed in a similar manner as the robots 115.

In some embodiments, tracks $15_i$ can be used by robots 115 sent by the system 130 to be integrated into the loading and unloading process. The integration is achieved through tracks $12_i$ and $6_i$, or via routes $11_1$ and $11_4$.

In some exemplary embodiments, additional tracks can be implemented in facility 100. For example, additional two tracks $85_i$ on the right and left are provided as VIP tracks. In some embodiments, additional tracks are provided in parallel with tracks $13_i$. By way of example specialized tracks can be designated as a quarantined area to which items 101 or carts 160 having harmful or questionable content can be directed for further processing and/or care through these additional tracks. By another way of example, in situations of health risks to travelers, such as in an airport baggage claim, the specialized tracks can be used to distance travelers in the airport from other travelers to prevent infection.

Automated cart 160 carrying items 101 (FIG. 1) travels onto drop-off zone 120 according to a designated cart route, referenced generally 90, to a parking spot, referenced generally 65,. Parking spot $65_i$ is arranged in a manner that facilitates unloading items 101 from automated cart 160. A person can stand at a pickup spot, referenced generally as $60_i$, which is arranged adjacent to parking spot $65_i$. In an exemplary embodiment where drop off zone 120 is baggage claim 440 (FIG. 4), a passenger can easily collect baggage in the automate cart 160 without having to stand and wait for the luggage to arrive on a conveyor belt and then have to pull the baggage from the conveyor belt.

Reference is now made to FIGS. 6A-6F and FIGS. 7A-7F combined outlining operations for routing robots through facility 100 (FIG. 1), according to certain exemplary embodiments.

FIG. 7A outlines operations for obtaining item information, according to certain exemplary embodiments.

In operation 700, item information is obtained, for example, at check-in area 105 (FIG. 1) as described in conjunction with FIG. 1, 5, 6B, 8B. In certain embodiments, person 500 (FIG. 5) provides item information through check-in station 520 (FIG. 5), for example, by inputting the information into check-in computer 530 (FIG. 5) or having clerk 103 (FIG. 5) input the information.

In operation 701 a receipt is provided to person 500, indicating that all of the item information is stored in database 145 (FIG. 1). Receipt can be used by person 500 at port of arrival to locate items 101 and to identify which cart 160 (FIG. 1) contains items 101.

In optional operation 702, person 500 links smart device 504 (FIG. 5) with system 130 (FIG. 1) to associate person 500 and smart device 504 with item information thereby facilitating the distribution of items 101 to person 500 upon arrival at arrival terminal 410 (FIG. 4). In some embodiments, person 500, using an application can scan receipt and communicate with system 130 thereby creating a connection between system 130 and person 500 and identifying person with items 101. This provides security to ensure that a notification of items location is provided to the owner of items 101. In some embodiments, system 130 stores information of person 500 in database 145, which can include name, citizenship, passport information, contact information and the like of the person 500. The information can also include flight information, number of items, type of items, or the like.

In operation 703, item and passenger information are stored in database 145.

In operation 704, system 130 provides smart device 504 with cart information. Upon arrival at the arrival terminal 410, person can access information about baggage claim and location of automated cart 160 in which the items 101 are awaiting pickup as described in conjunction with FIGS. 6D, 6F.

In some embodiments, person 500 does not own a smart device and must use the receipt to access information of items 101. For example, person 500 uses a baggage claim public computer to scan the receipt and receive information about the location of automated cart 160 and the associated items.

In some embodiments, where person 500 did not retain the receipt upon arrival, the person 500 can obtain a copy of the receipt from a flight attendant or clerk in the arrival terminal 410.

FIG. 7B outlines operations for processing robots 115 (FIG. 1), that are right of the median in preliminary sorting, according to certain exemplary embodiments. In Operation 705, system 130 determines the location of each robot 115 positioned on track $3_3$ (FIG. 6B) that is right of the median.

In 708, system 130 determines whether an automated cart 160 (FIG. 1) has been associated with item 101 (FIG. 1).

In operation 710, system 130 determines that item 101 has been associated with automated cart 160 and determines whether automated cart 160 is positioned to the left or right of median.

In operation 712, system 130 tags robot 115 with a value of 1 when a determination has been made that automated cart 160 is to the right of the median.

In operation 713, system 130 tags robot 115 with a value of 2 when a determination has been made that automated cart 160 is to the left of the median.

In operation 715, system 130 determines item 101 has not been associated with an automated cart 160 and searches for an empty cart.

In operation 718, system 130 determines an automated cart is available to the right of median and tags robot 115 with a value of 1.

In operation 720, system 130 determines an automated cart is available to the left of median and tags robot 115 with a value of 2.

In operation 725, system 130 determines there is no available automated cart and tags robot 115 with a value of 3.

FIG. 7C outlines operations for processing robots 115 (FIG. 1) that are left of the median in preliminary sorting, according to certain exemplary embodiments.

In operation 728, system 130 determines the location of each robot 115 positioned on track $3_3$ (FIG. 6B) that is left of the median.

In 730, system 130 determines whether an automated cart 160 (FIG. 1) has been associated with item 101 (FIG. 1).

In operation 732, system 130 determines that item 101 has been associated with automated cart 160 and determines whether automated cart 160 is positioned to the left or right of median.

In operation 735, system 130 tags robot 115 with a value of 1 when a determination has been made that automated cart 160 is to the left of the median.

In operation 738, system 130 tags robot 115 with a value of 2 when a determination has been made that automated cart 160 is to the right of the median.

In operation 740, system 130 determines item 101 has not been associated with an automated cart 160 and searches for an empty cart.

In operation 742, system 130 determines an automated cart is available to the right of median and tags robot 115 with a value of 4.

In operation 745, system 130 determines an automated cart is available to the left of median and tags robot 115 with a value of 1.

In operation 748, system 130 determines there is no available automated cart and tags robot 115 with a value of 3.

FIG. 7D outlines operations for processing robots 115 (FIG. 1) that have been tagged, according to certain exemplary embodiments.

In operation 750, system 130 (FIG. 1) mobilize tagged robots that are positioned on track $3_3$.

In operation 752, system 130 simultaneously moves all robots tagged with value 1 to track $5_1$.

In operation 755, system 130 simultaneously moves all robots tagged with value 2 to track $4_1$.

As soon as track $4_1$ becomes free on his left side, all robots on track $4_1$ simultaneously move to the left side of $4_1$ and merge into track $5_1$.

In operation 758, system 130 simultaneously moves all robots tagged with value 4 to track $4_2$.

As soon as track $4_2$ becomes free on his right side, move all robots on it simultaneously to the right side of $4_2$ and merge into $5_1$.

In operation 760, system 130 stalls robots with value 3 on track $3_3$ for a next round of robot movement.

Figure 7E:
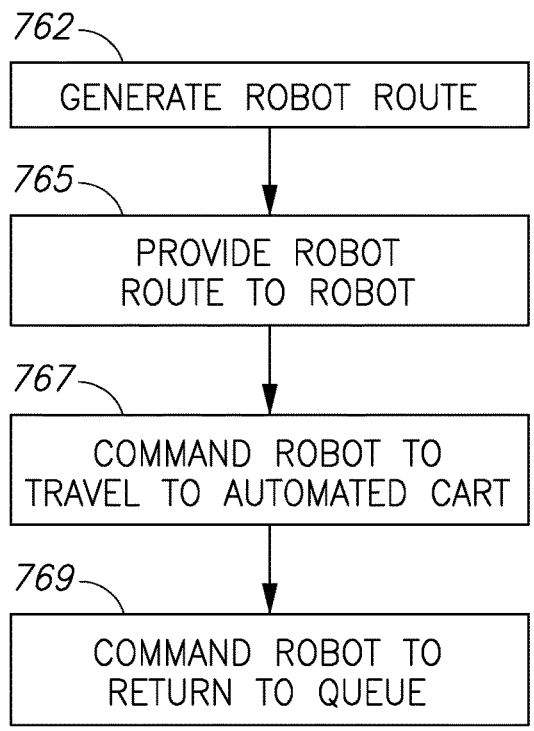
FIG. 7E outlines operations for providing a travel route to a robot, according to certain exemplary embodiments.

Referring to FIG. 7E outlining operations for routing robot 115 (FIG. 1) to automated cart 160 (FIG. 1), according to certain exemplary embodiments.

In Operation 762, robot route 700 (FIG. 6C) is generated by which robot 115 will travel to automated cart 160 (FIG. 1). Robot route 700 is generated by system 130 (FIG. 1) to prevent robot 115 from colliding with other robots traveling in robot travel area and providing a shortest route for robot 115 to automated cart 160. Robot route 700 can include two-part route having first route 710 (FIG. 6C) and second route 715 (FIG. 6C).

In Operation 765, system 130 provides robot route 700 to robot 115.

In Operation 767, robot 115 is commanded to travel to automated cart 160. Robot 115 travels according to robot route 700 along the two-part route until it reaches automated cart 160. Robot 115 travels along first route 710 until robot 115 is opposite of automated cart 160, at which time robot 115 travels along second route 715 to reach automated cart 160. In certain exemplary embodiments, where multiple robots are simultaneously travelling, once robot 115 completes first route 710, it waits to allow other robots to pass by thereby avoiding collision, after which robot 115 resumes traveling along second route 715. Once robot 115 reaches automated cart 160, robot 115 stops moving and unload its parcel 101 into carts 160 by using conveyor belt 208.

Figure 7F:
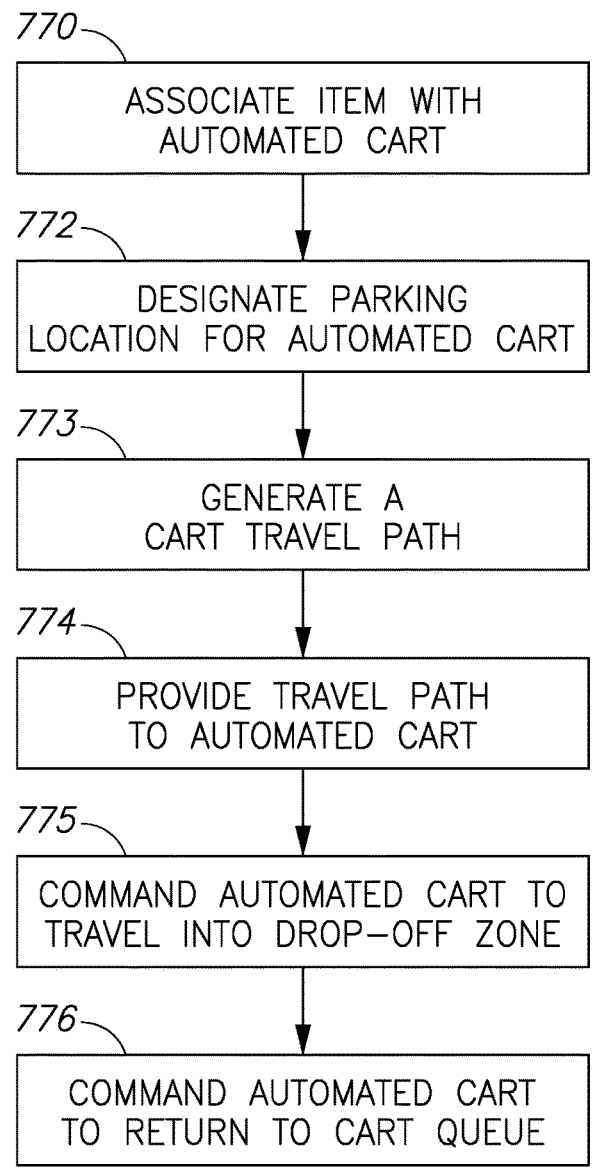
FIG. 7F outlines operations for operating an automated cart, according to certain exemplary embodiments.

In Operation 769, once item 101 (FIG. 1) is unloaded from robot 115, robot 115 is commanded by system 130 to return to robot queue $6_t$ in which it waits to collect a new item. FIG. 7F outlines a method for operating an automated cart 160 (FIG. 1), according to certain exemplary embodiments.

In Operation 770 items 101 (FIG. 1) are associated with automated cart 160. Items 101 are brought to automated cart 160 by separate robots 115 (FIG. 1).

In Operation 772 a parking location for loaded automated cart 160 is designated in drop-off zone 120 (FIG. 1, 6F). By way of example, the parking location can be in a parking row $65_i$ (FIG. 6D), directed to specialized tracks ($85_i$) FIG. 6D, and/or the like.

In Operation 773 cart route is generated by system 130 to direct automated cart 160 to a designated spot at which person can collect items 101.

In Operation 774, system 130 provides cart route to automated cart 160.

In Operation 775, system 130 commands automated cart 160 to travel along cart route.

In Operation 776, system 130 commands automated cart 160 to return to cart queue $11_1$ or $11_4$ (FIGS. 6C-6D) upon removal of items 101 from automated cart 160.

FIGS. 8A-8D schematically illustrate departure area 405 (FIG. 4) of airport terminal 400 (FIG. 4), according to certain exemplary embodiments. It is appreciated that like departure area 405, a similar layout can be used for train terminals, warehouses, and other locations that handle the sorting and routing of items from one or more check-in points to various destinations or various pick-up and/or storage locations.

Figure 8A:
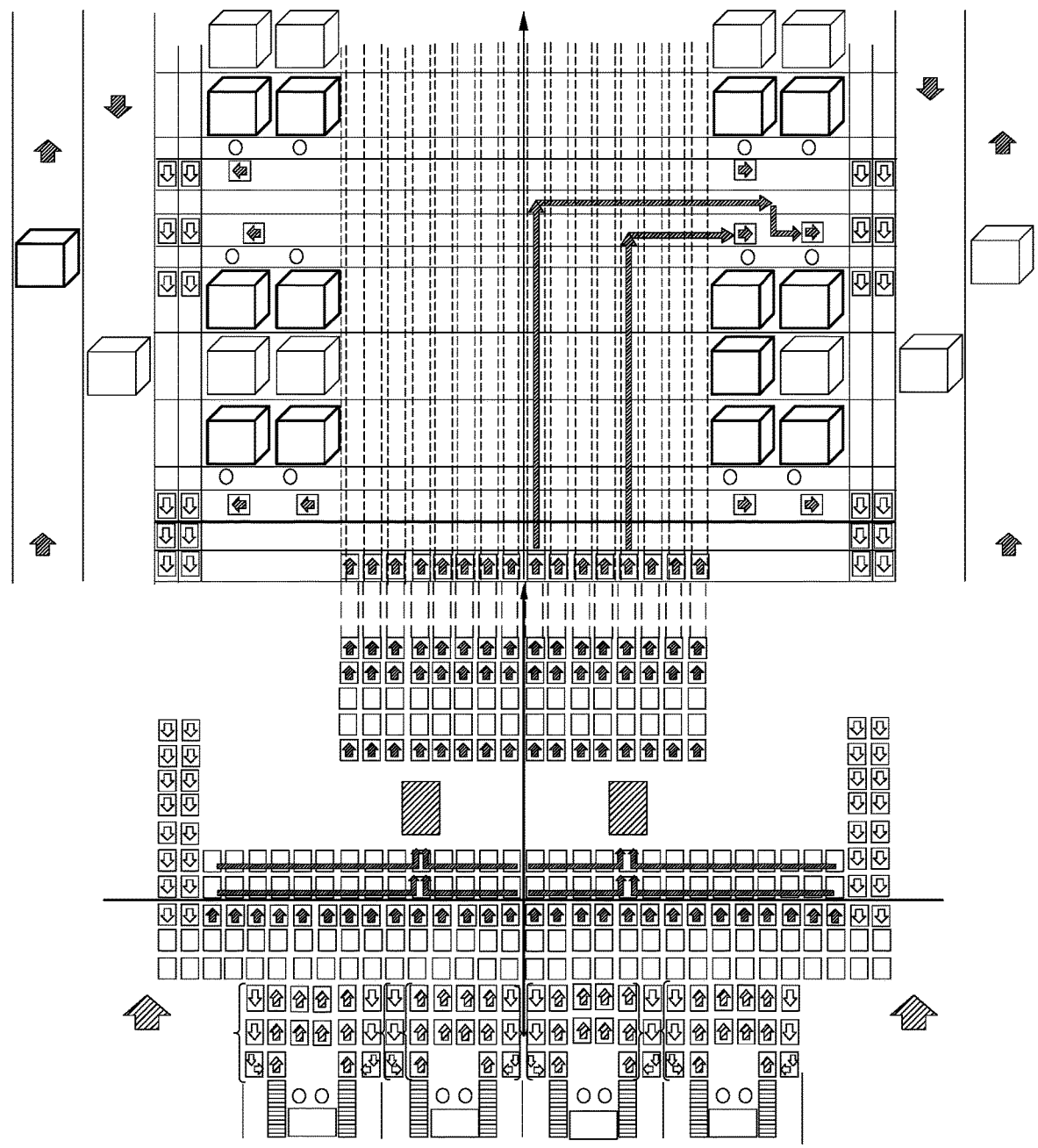
FIG. 8A schematically illustrates a departure terminal, according to certain exemplary embodiments.
Figure 8B:
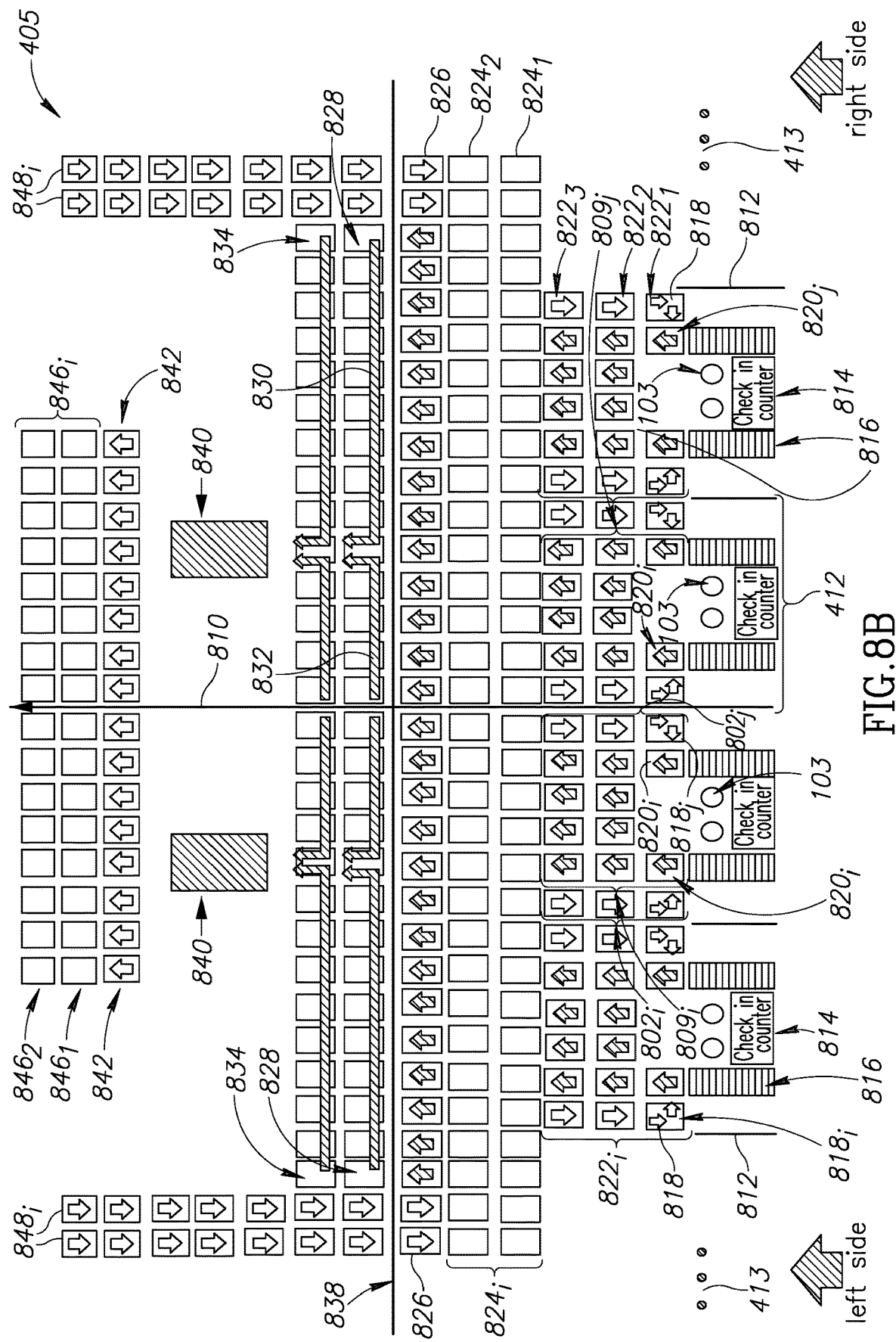
FIGS. 8B-8C schematically illustrates a departure area of an airport implementing the automated transportation of items therethrough, according to certain embodiments; and, FIG. 8D schematically illustrates implementation of robot transport of an item in a loading zone of the departure area, according to certain exemplary embodiments.

FIG. 8B schematically illustrates check-in area 407 (FIG. 4) and robot sorting and transporting area 408 (FIG. 4), according to certain embodiments. Check-in area 405 (FIG. 8B) includes one or more check-in stations 412, illustrated as four instances of check-in station 412, representing any number of check-in stations 412, as indicated by dashed line 413. Departure terminal 405 configured along a line of symmetry (median), referred generally 810, to facilitate the transfer of items therethrough.

FIG. 8B schematically illustrates a check-in area 405, according to certain exemplary embodiments. Each check-in station 412 can include a partition 812 for separating travelers from one another. Each check-in station 814 includes conveyor belts 816 on which an item 101 (FIG. 1) is positioned to be accepted by a clerk 103 operating the check-in station 814 or by the passenger itself. Clerk 103 or passenger inputs the item information into a computer of check-in station 814, after which, conveyor belt 816 transfers item 101 to robot 115 positioned in loading position $820_i$ positioned near conveyor belt 816. Index 'i' is for cells positioned left to check-in counter and index 'j' is for cells positioned right to check-in counter. Loaded robots 115 travel along vertical track $809_i$ or $809_j$ and stops at horizontal track $822_3$, and wait for instructions from central system. Unloaded robot from waiting position $818_i$ or $818_j$ moves to loading position $820_i$ or $820_j$. Unloaded robots' vertical tracks $802_i$ and $802_j$ are filled by unloaded robots from tracks $848_i$ through tracks $824_i$. Tracks $824_i$ serves for transmitting unloaded robots from tracks $848_i$ to tracks $802_i$ and $802_j$, and for transmitting loaded robots from tracks $822_3$ to track 826 when instructed to move on. There are no stops on tracks $824_i$. Robot positioned at the meeting between track $809_i$ and track $822_3$ can move one cell to the right if the cell is clear. Robot positioned at the meeting between track $809_j$ and track $822_3$ can move one cell to the left if the cell is clear.

When tracks $824_i$ and track 826 are clear the system instructs loaded robots to move simultaneously from track $822_3$ to transition track 826 to be positioned in preparation to go through scanning devices 840.

Median 838 provides a representation of separating two parts that are not equal in length. Below the median 838 is the check-in area. In this part there are one or more counters, In some embodiments, there can be 40, 50, 60 or more counters, where each airline has a predetermined number of counters. The length of tracks $824_i$ and 826, is the same as the length of the total check-in area. In contrast to the lengths of tracks $824_i$ and 826, the length of tracks above line 838 is shorter and better suited for sorting of the robots in the sorting matrix.

As multiple robots are loaded from multiple check-in stations $814_i$, after robots move to track 826, they are in a sense scattered across the track, and then the system begins to concentrate them right and left to the middle of track 826, After concentrating, they move to track 828, and from there to the isolation booth 840. It is clear that there may not be enough room in 828 for all the robots coming from 826. In this case, robots waiting on track 826 will be given priority over the others robots waiting on $822_3$. In certain exemplary embodiments, isolation booth 840 can be a security booth for scanning and checking items 101 to ensure that they do not contain dangerous content. In certain exemplary embodiments, isolation booth 840 can check items 101 to ensure they do not carry dangerous contagions, that can spread diseases, and can provide disinfection and/or sterilization of the items 101.

Track 828 is divided according to the number of isolation booths 840 available. In some exemplary embodiments, where the number of facilities is for example three facilities, then track 828 is divided into three parts. Each part has a right side 830 and a left side 832. The robots 115 flow into an isolation booth 840, once from the right side 830 and once from the left side 832. Track 834 is designed to receive robots 115 that carry items 101 that are designated with a higher priority. Such as giving priority to a flight that should depart soon. In this case, robots will travel directly from track 826 to track 834. and from there into the isolation booth 840.

Figure 8C:
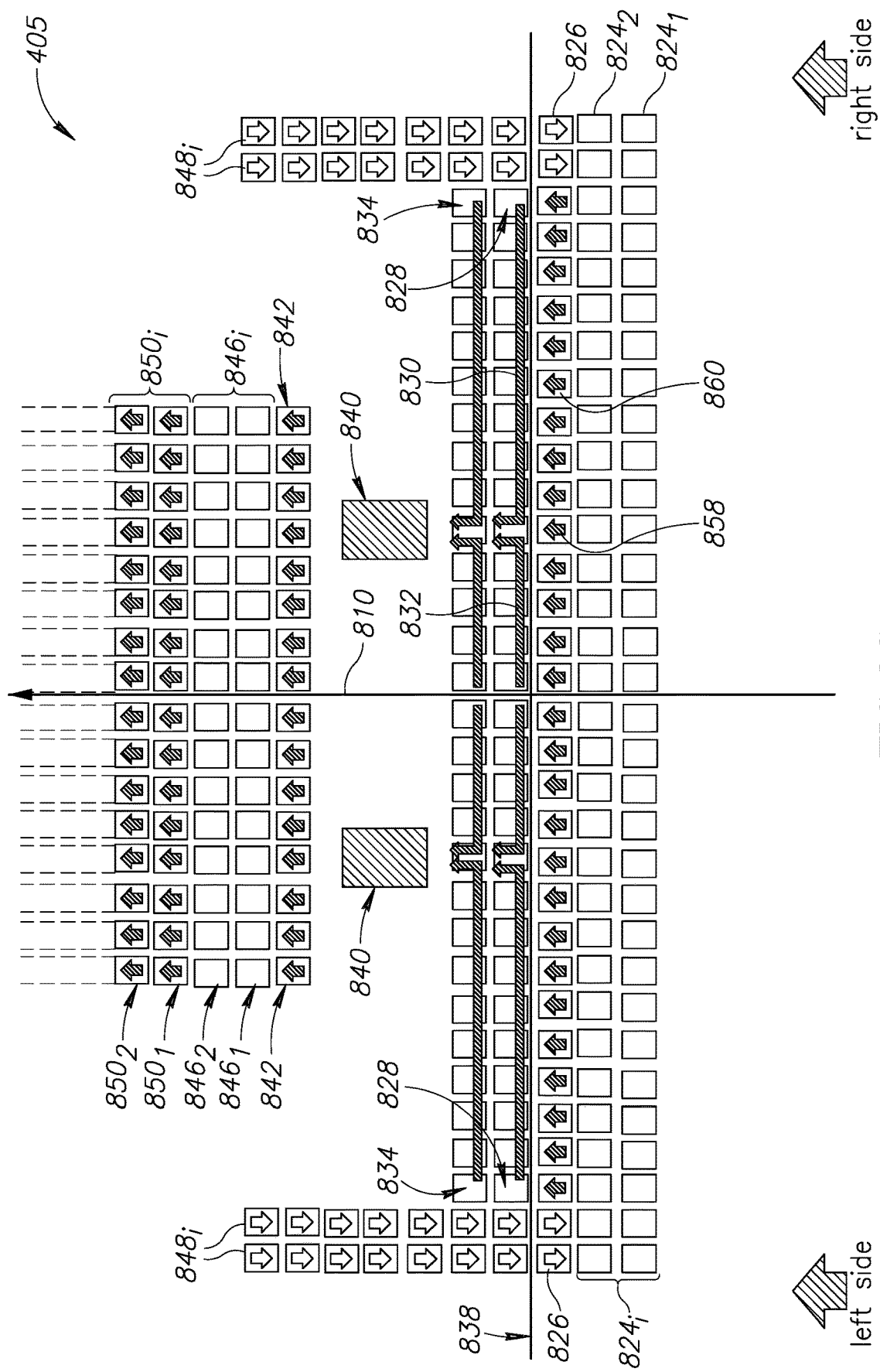

FIG. 8B schematically illustrates a secondary transition area of check-in area 105, according to certain exemplary embodiments. The secondary clearance area includes first rows 826, 828, 834, 842, transition rows $846_i$ and starting position rows $850_i$ (FIG. 8C). Robots 115 are organized in secondary transition area according to a method of operation as described in conjunction with FIG. 8C.

Robots are positioned on track 826 and are designated to travel to track 8501. In preparation for entering the sorting matrix (FIG. 8D), the robots are organized on tracks 842 and 8501 in a way that avoids collisions between robots on tracks $886_i$ when traveling through the sorting matrix.

Sorting matrix (FIG. 8D) is configured to direct the robots to the designated flights. The sorting matrix has a left side and a right side. A median 810 separates the two sides. From the moment of registration at check-in, the system knows where each robot/item is intended to get. That is, for which flight it is intended, or for which container it is intended, or for which side of the matrix where the container is located is intended, right or left. For example: if item is intended to flight 101 so the robot has to go left, to container 892 and if item is intended to flight 006 so the robot has to go right, to container 893.

From track 826 the robots enter the isolation booth 840. Once exiting the isolation booth 840, the robots are regrouped and organized on the left side of the median 810 between themselves, and system 130 organizes the robots on the right side among themselves. That is, the organization is within the right side, and within the left side of the median. Robots 115 from the right side of the median do not move to the left side or vice versa.

As mentioned, on tracks $890_i$ (FIG. 8D) there may be containers on both sides of tracks $890_i$, containers intended for different flights. The containers on each side are placed in a certain order, this is the order of bringing them to track $890_i$. In some embodiments, (see FIG. 8C and FIG. 8D combined) by way of example, robot 860 is destined for flight 003 and robot 858 is destined for flight 004. If robots 115 move to track 842, and are positioned on track 842 in the order in which they are arranged on track 826, i.e., 860 to the right of 858, because then when the robots reach track 8862 on the sorting matrix, they will block each other, i.e. robot 860 will block 858 until the item treatment is over. Therefore, when moving to track 842, robot 858 can move to the right of robot 860 and there will be no obstruction on track 8861.

When exiting the isolation booth 840, robot 858 is directed as far as possible to the right on track 842. If out of the robots on the right side of track 826 there is one or more robots that need to be right from 858, because then reserve space is reserved for robots on track 842, and the robots are positioned right to 858. But it might not be enough to prevent a blockage. Because there may be robots that are on the left side of the median of track 842 and are designed for flights that are on the right side. Therefore, a bypass track $880_i$ is provided to enable robots to move smoothly.

When moving from track 842 to track 8501, tracks $846_i$ facilitate organizing the location of the robots 115 on track 8501. The aim is to drive all the robots on track 842 and intended for containers on the right side of the median to be on the right side of the median on 8501, and to drive all those intended for containers on the left side of the median to be on the left side of the median on 8501. Before executing the operations outlined in FIGS. 7B-7D tracks need to be rearranged as follows:
 a. track $3_3$ by track 842,
 b. track $5_1$ by track 8501,
 c. track $4_1$ by track 8461,
 d. track $4_2$ by track 8462, and
 e. 'automated cart 160' by 'container'.

Pursuant execution of the operations outlined in FIGS. 7B-7D cannot ensure robots 115 on track $850_1$ are positioned in the desired order of the containers for the flights. Therefore, sorting matrix includes as was described before a bypass track $880_i$.

In some embodiments, two or more robots, referenced generally as 858 and 860, have the same trajectory X on track $886_i$. For example, robot 858 is destined for flight 004 and robot 860 is destined for flight 003. The two robots reach track $886_2$ one after the other. Although both robots 858 and 860 can advance on track $886_2$, however robot 858 will have to wait until robot 860 is emptied and processed. In order to avoid the waiting time, track $880_i$ is provided to enable robot 858 to bypass robot 860 and integrate into track $886_2$ adjacent to its designated flight. Track $880_i$ could also serve quick removal of unloaded robots.

Figure 8D:
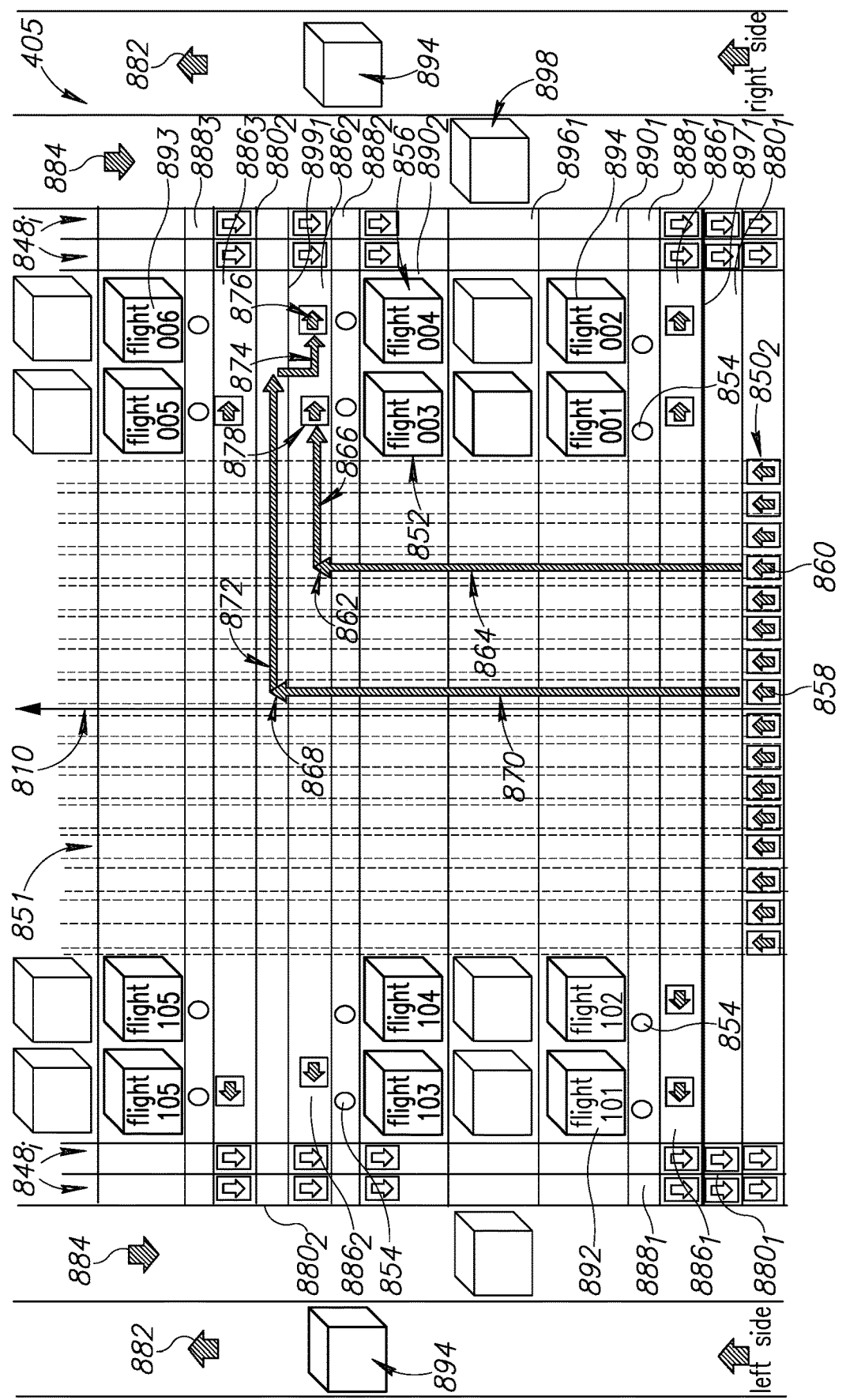

FIG. 8D shows a loading zone 410 (FIG. 4) of departure area 405 (FIG. 4), according to certain exemplary embodiments. Loading zone 410 (FIG. 8D) includes two tracks, referenced generally 882 and 884 on opposite sides of sorting matrix 410.

Track 882 is configured to transport full containers to aircrafts.

Track 884 is configured for bringing empty containers.

Track $850_2$ includes robots loaded with items 101 to reach sorting matrix.

Track $850_2$ is followed by a track $880_1$, which is configured as a bypass track, which directs robots 115 to track $886_1$.

Track $880_1$ is followed by track $886_1$. Robots 115 that are designated for this track are directed to this track.

Sorting matrix includes track $888_1$, on which are porters 854 for removing items 101 from robots 115 and putting them into containers.

Track $888_1$ is followed by track $890_1$, on which containers 894 are parked for loading, and which are intended for aircrafts. Items 101 are inserted into them by the porters mentioned. The number of containers on the right can be one or more. And so, on the left.

Positioning two or more containers in a row reduces the size of the sorting matrix, to reduce the number of tracks on it, thereby reducing the time robots 115 spend inside sorting matrix.

Track $890_1$ is followed by track $896_1$, used to transport full containers 894 to aircrafts, and to return empty aircrafts 898. For example, container of flight 002 when it is full or the flight time has arrived, it leaves from where it is parked, moves to track $896_1$, and from there to track 882. Track $896_1$ is used by both tracks 882 and 884.

Track $896_i$ is followed by a track identified by $890_2$, on which containers 894 are parked intended for aircraft, and items are loaded into them by the porters.

Track $890_2$ is followed by a track $888_2$. On this line are porters 854.

Track $888_2$ is followed by track $886_2$. Robots 115 that are designated for this track are directed to this track.

Track $886_2$ is followed by bypass track $880_2$.

Tracks $886_1$-$886_2$ are followed by one or more identical repeating units and in between bypass track $880_2$ is positioned. The unit borders are marked by $897_1$ and $899_1$. These units are numbered in digits 1, 2 and so forth. Units can be added as necessary for increasing the efficiency and throughput of sorting matrix.

Robots 115 arrive at track $850_1$, then robots 115 simultaneously advance to track $850_2$. Positioned in starting row $850_2$ robots 115 are provided with a robot route, referenced generally 862, 868, to reach a destination, referenced generally 878, 876. Robots 115 reach starting row $850_2$ on a side of central line 810 to facilitate quick and efficient routing of robots to destination 878, 876, which was determined according to the item information and cart location, as described in conjunction with FIGS. 7B-7D.

Each route includes a first vertical route Y, referenced generally 864, 870, and a second horizontal route X, referenced generally 866, 872. From $850_2$ all robots 115 simultaneously enter the sorting matrix. All robots 115 do the vertical trajectory Y simultaneously, and after completing the vertical trajectory they do simultaneously the horizontal trajectory X. In certain embodiments, to avoid congestion and delay, an additional lane $880_i$ is provided to facilitate routing robots 115 to reach a destination 876 when the way is blocked by a robot parked at a destination 878 that is in the way of the travelling robot. In the example described robot 858 has to reach track $880_2$ and from there arrive to track $886_2$. Destination 878, 876 position robots 115 next to containers, referenced generally 852, 856. Porters 854 unload items 101 from robots 115 located at destination 852, 856 after which robots 115 return to receive new items via return routes, referenced generally $848_i$.

Each container 852, 856 is associated with a different destination, for example, a flight to which items 101 (FIG.

1) put in each cart 852, 856 are transferred. Once containers 852, 856 are filled with all items 101, containers 852, 856 are routed to route, illustrated by arrow, referenced generally 882, to transport items 101 to their final destination. Containers 852, 856 return via route, illustrated by arrow, referenced generally 884.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly including additional elements such as memory or communication ports.

Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally including or linked with a processor or other circuitry.

The term computerized apparatus or a computerized system or a similar term denotes an apparatus including one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or including a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which includes one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" and/or "includes" and/or "including" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

Unless otherwise specified, the terms 'about' and/or 'close' with respect to a magnitude or a numerical value implies within an inclusive range of −10% to +10% of the respective magnitude or value.

Unless otherwise specified, the terms 'about' and/or 'close' with respect to a dimension or extent, such as length, implies within an inclusive range of −10% to +10% of the respective dimension or extent.

Unless otherwise specified, the terms 'about' or 'close' imply at or in a region of, or close to a location or a part of an object relative to other parts or regions of the object.

When a range of values is recited, it is merely for convenience or brevity and includes all the possible sub-ranges as well as individual numerical values within and about the boundary of that range. Any numeric value, unless otherwise specified, includes also practical close values enabling an embodiment or a method, and integral values do not exclude fractional values. A sub-range values and practical close values should be considered as specifically disclosed values.

As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

Terms in the claims that follow should be interpreted, without limiting, as characterized or described in the specification.

The invention claimed is:

1. A system for transporting items, comprising:
   at least two robots, each configured to transport at least one item throughout a facility, wherein each robot of said at least two robots transfers the at least one item along a designated robot route;
   at least one automated cart configured to transport the at least one item received from at least one robot of said at least two robots, said at least one automated carriage configured to transport said at least one item along a designated cart route; and,
   a communication unit configured to provide said designated robot route to said at least two robots and said designated cart route to said at least one automated cart;
   at least one processor configured to:
      assign said at least two robots to collect the at least one item;
      assign said at least one automated cart to receive the items for said at least two robots;
      generate said designated robot route;
      designate a destination of said at least one automated cart; and,
      generate said designated cart route for said at least one automated cart.

2. A system according to claim 1, wherein said at least one processor is configured to:
   simulate a symmetric matrix of tracks through which said robot route and cart route are routed;
   determine a position within matrix of said at least two robots; and,
   determine whether each robot of said at least two robots has been associated with said at least one automated cart.

3. A system according to claim 2, wherein said at least one processor is further configured to:
   determine a position of said automated cart relative to a central line of said symmetric matrix;
   determine whether a robot of said at least two robots associate with said at least one automated cart is positioned to the left or the right said symmetric line; and,
   assign a value to said robot according to position relative to said symmetric line, said value determines when said robot travels to said at least one automated cart.

4. A system according to claim 3, wherein said at least one processor is configured to command said at least two robots to simultaneously move to said automated cart.

5. A system according to claim 1, wherein:
   the robot path is arranged along a x-y coordinate system; and,
   the cart path is arranged along a second x-y coordinate system.

6. A system according to claim 1, wherein:
   each robot is configured to return to a robot queue after deliver of the item to the automated cart according to a designated robot return path generated by the central system; and,
   each automated cart is configured to return to a cart queue after the items are removed from the automated cart according to a designated cart return path generated by the central system.

7. A system according to claim 1, wherein the computer system further comprises a scanner at drop off zone configured to scan an item tag attached to the item to obtain an item identification; wherein said at least one processing unit is further configured to:
   obtain the item identification from the scanner;
   associate the item identification with the robot and the automated cart carrying the item;
   provide a notification of the item location in the drop-off zone.

8. A system according to claim 1, wherein robots are arranged in a robot arrangement matrix prior to travelling through the robot travel zone to enhance a movement of the robot.

9. A system according to claim 1, further comprising a check-in station comprising:
   a check-in scanner configured to scan an item tag to obtain an item identification;
   a check-in communication unit configured to provide the item identification to the computer system, wherein the item identification is stored with item information in a database of computer system.

10. A system according to claim 1, wherein the one or more robots are arranged in a robot arrangement matrix to expedite movement of said at least two robots.

11. A method for transporting of at least one item performed by at least one processor configured to:
    assign at least two robots to each collect the at least one item;
    assign at least one automated cart;
    generate a designated robot route;
    designate a destination of said at least one automated cart; and,
    generate said designated cart route for said at least one automated cart.

12. A method according to claim 11, wherein said at least one processor is further configured to:
    simulate a symmetric matrix of tracks through which said robot route and cart route are routed;
    determine a position within matrix of said at least two robots; and,
    determine whether each robot of said at least two robots has been associated with said at least one automated cart.

13. A method according to claim 12, wherein said at least one processor is further configured to:
    determine a position of said automated cart relative to a central line of said symmetric matrix;
    determine whether a robot of said at least two robots associate with said at least one automated cart is positioned to the left or the right said symmetric line; and,
    assign a value to said robot according to position relative to said symmetric line, said value determines when said robot travels to said at least one automated cart.

14. A method according to claim 11, wherein said at least one processor is configured to command said at least two robots to simultaneously move to said automated cart.

15. A method according to claim 11, wherein:
    the robot path is arranged along a x-y coordinate system; and,
    the cart path is arranged along a second x-y coordinate system.

16. An airport system for dispersal of luggage, comprising:

two or more robots, each robot configured to collect at least one luggage item from a collection zone and carry the luggage to an automated cart along a robot path, two or more automated carriage, each automated cart having a compartment into which the at least one luggage item is placed after delivery by a robot of said at least two robots, each automated carriage configured to carry the at least one luggage item to a designated parking spot in a baggage claim area, automated cart is configured to travel along a cart path; and, a computerized system comprising:
 a communication unit configured to enable communication with said at least two robots and the two or more automated carts;
 at least one processor configured to:
  designate at least one robot of said two or more robots to collect the at least one luggage item;
  designate an automated cart of said at least two automated carts to which said at least one robot delivers the at least one luggage item;
  generate said robot path for said at least one robot to travel from the collection zone to said at least one automated cart;
  designate the designated parking spot for said at least one automated cart; and,
  generate the cart path for the automated cart.

17. An airport system according to claim 16, wherein said at least one processor is further configured to:
 simulate a symmetric matrix of tracks through which said robot route and cart route are routed;
 determine a position within matrix of said at least two robots; and,
 determine whether each robot of said at least two robots has been associated with said at least one automated cart.

18. An airport system according to claim 17, wherein said at least one processor is further configured to:
 determine a position of said automated cart relative to a central line of said symmetric matrix;
 determine whether a robot of said at least two robots associate with said at least one automated cart is positioned to the left or the right said symmetric line; and,
 assign a value to said robot according to position relative to said symmetric line, said value determines when said robot travels to said at least one automated cart.

19. An airport system according to claim 16, wherein said at least one processor is configured to command said at least two robots to simultaneously move to said automated cart.

20. An airport system according to claim 16, wherein:
 the robot path is arranged along a x-y coordinate system; and,
 the cart path is arranged along a second x-y coordinate system.

\* \* \* \* \*